(12) United States Patent
Kobayashi

(10) Patent No.: US 11,055,909 B2
(45) Date of Patent: Jul. 6, 2021

(54) IMAGE PROCESSING DEVICE AND IMAGE PROCESSING METHOD

(71) Applicant: SONY CORPORATION, Tokyo (JP)

(72) Inventor: Goh Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/639,405

(22) PCT Filed: Aug. 8, 2018

(86) PCT No.: PCT/JP2018/029734
§ 371 (c)(1),
(2) Date: Feb. 14, 2020

(87) PCT Pub. No.: WO2019/039282
PCT Pub. Date: Feb. 28, 2019

(65) Prior Publication Data
US 2020/0258299 A1 Aug. 13, 2020

(30) Foreign Application Priority Data
Aug. 22, 2017 (JP) .............................. JP2017-159457

(51) Int. Cl.
*G06T 17/20* (2006.01)
*G06T 7/50* (2017.01)
*G06T 7/70* (2017.01)
*G06T 7/40* (2017.01)
*G06T 15/04* (2011.01)
*G06T 15/20* (2011.01)

(52) U.S. Cl.
CPC .............. *G06T 17/20* (2013.01); *G06T 7/40* (2013.01); *G06T 7/50* (2017.01); *G06T 7/70* (2017.01); *G06T 15/04* (2013.01); *G06T 15/20* (2013.01); *G06T 2207/10028* (2013.01); *G06T 2207/30244* (2013.01)

(58) Field of Classification Search
None
See application file for complete search history.

(56) References Cited

U.S. PATENT DOCUMENTS

2009/0010507 A1* 1/2009 Geng ...................... G06T 7/593
382/128
2009/0046152 A1* 2/2009 Aman .................. G06K 9/3216
348/157

FOREIGN PATENT DOCUMENTS

| JP | 2004-302524 A | 10/2004 |
| JP | 2007-220121 A | 8/2007 |
| JP | 2011-070387 A | 4/2011 |

OTHER PUBLICATIONS

Tervan et al., "A Multiple Camera Calibration and Point Cloud Fusion Tool for KinectV2", Elsevier, 2016. (Year: 2016).*

(Continued)

*Primary Examiner* — Nicholas R Wilson
(74) *Attorney, Agent, or Firm* — Paratus Law Group, PLLC

(57) ABSTRACT

There is provided an image processing device and an image processing method that make it possible to reduce a processing load in modeling a plurality of 3D objects. A 3D reconstruction device includes a 3D model generator that acquires object spatial information indicating a 3D region of an object for each object, and generates a 3D model of an object for each object space. For example, the present technology is applicable to an image processing device or the like that generates a 3D model.

21 Claims, 26 Drawing Sheets

(56) References Cited

OTHER PUBLICATIONS

Crassin et al., "GigaVoxels—Ray-Guided Streaming for Efficient and Detailed Voxel Rendering", ACM, 2009. (Year: 2009).*
Wu et al., "Real-Time Dynamic 3-D Object Shape Reconstruction and High-Fidelity", IEEE, 2004. (Year: 2004).*
Moezzi et al., "Virtual View Generation for 3D Digital Video", IEEE, 1997. (Year: 1997).*

* cited by examiner

[FIG. 1]
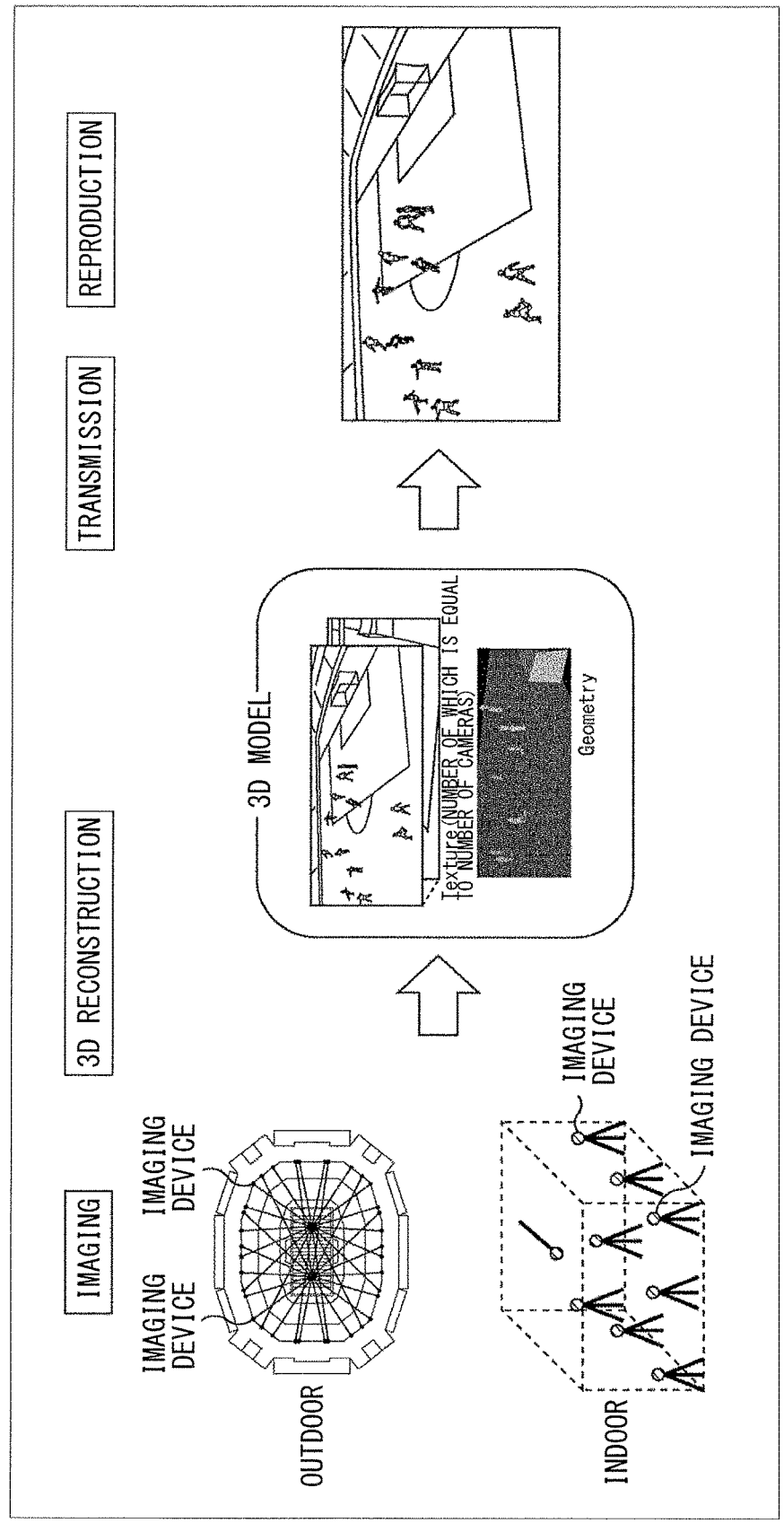

[FIG. 2]
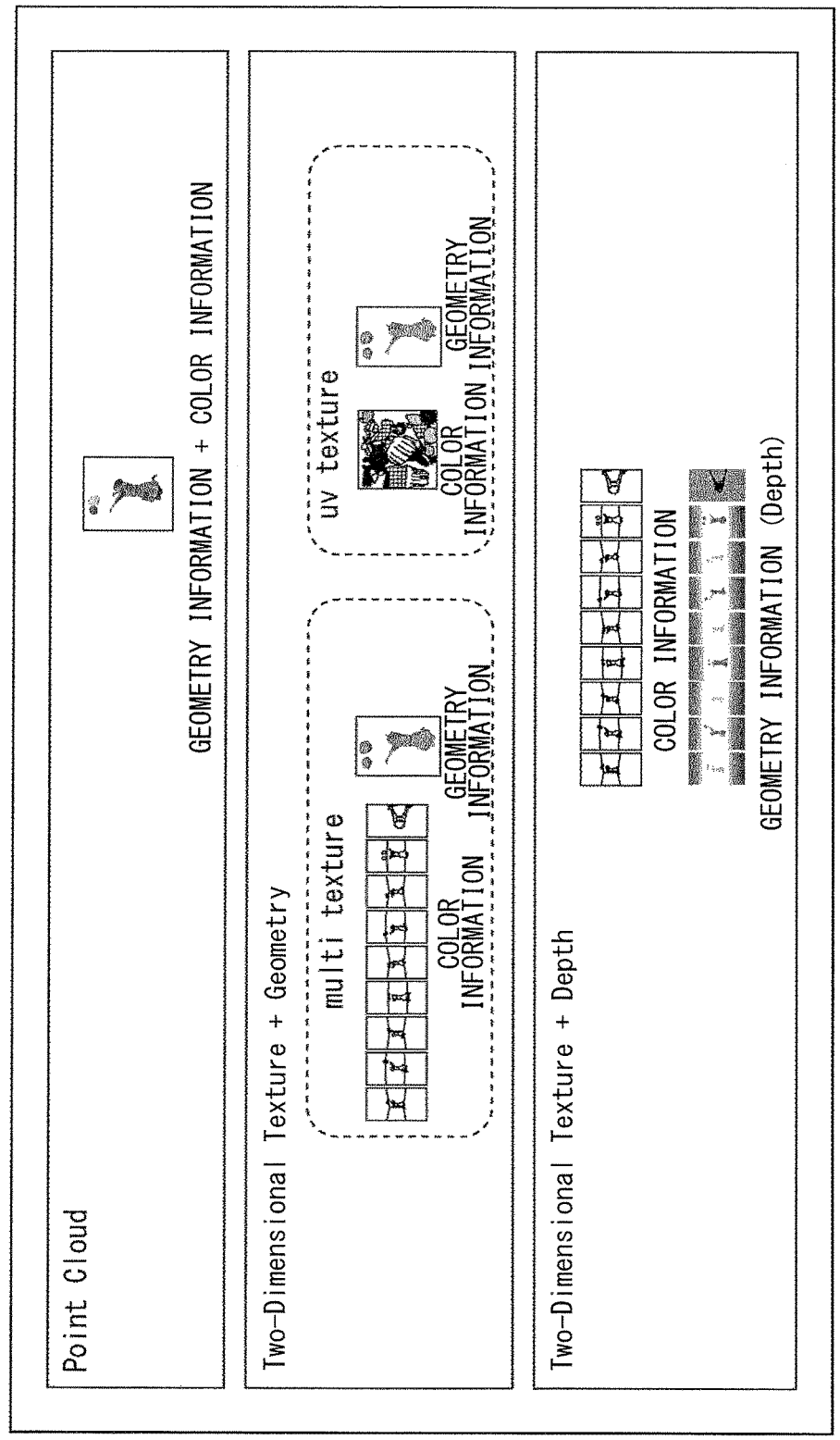

[FIG. 3]
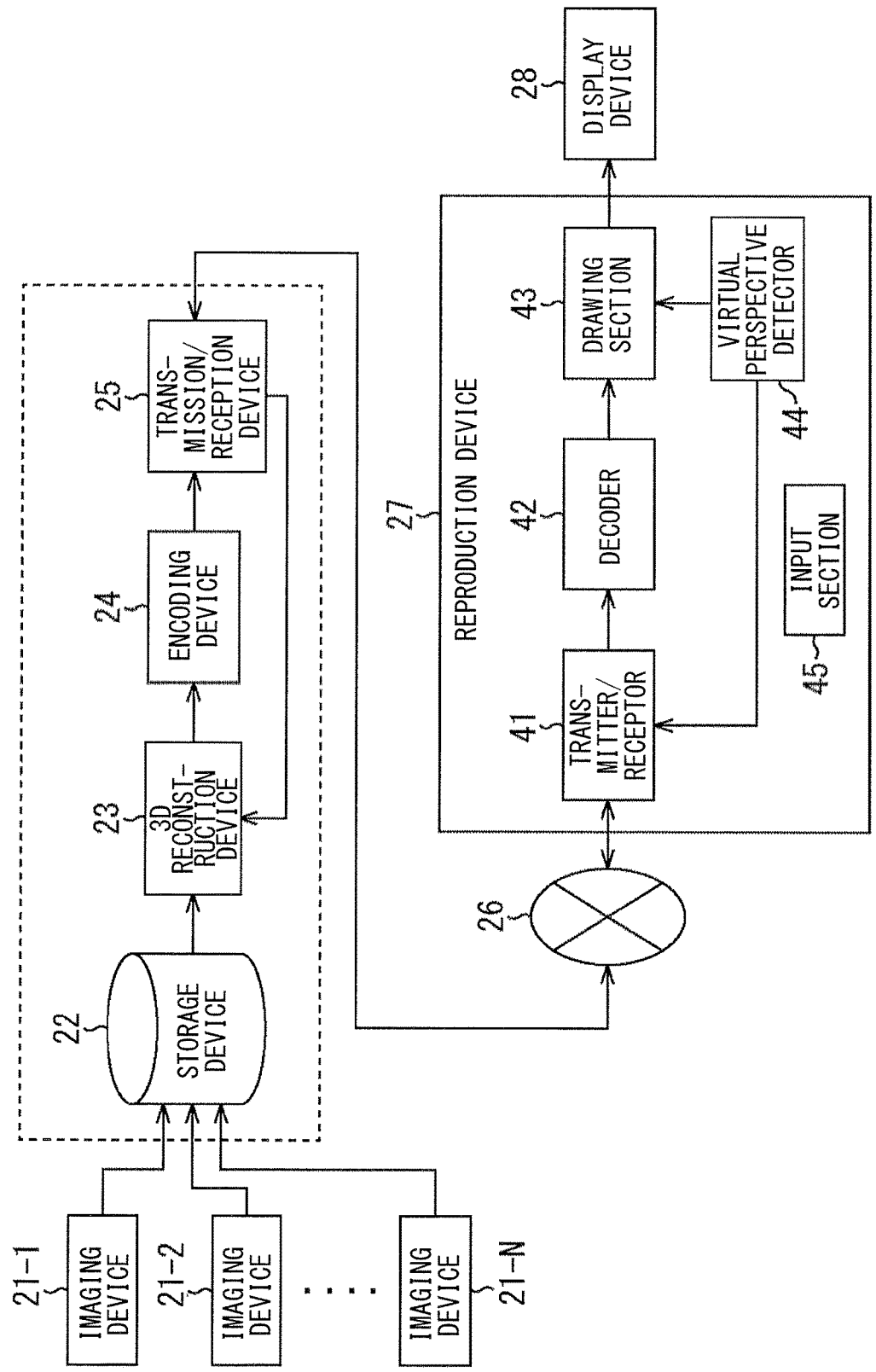

[ FIG. 4 ]
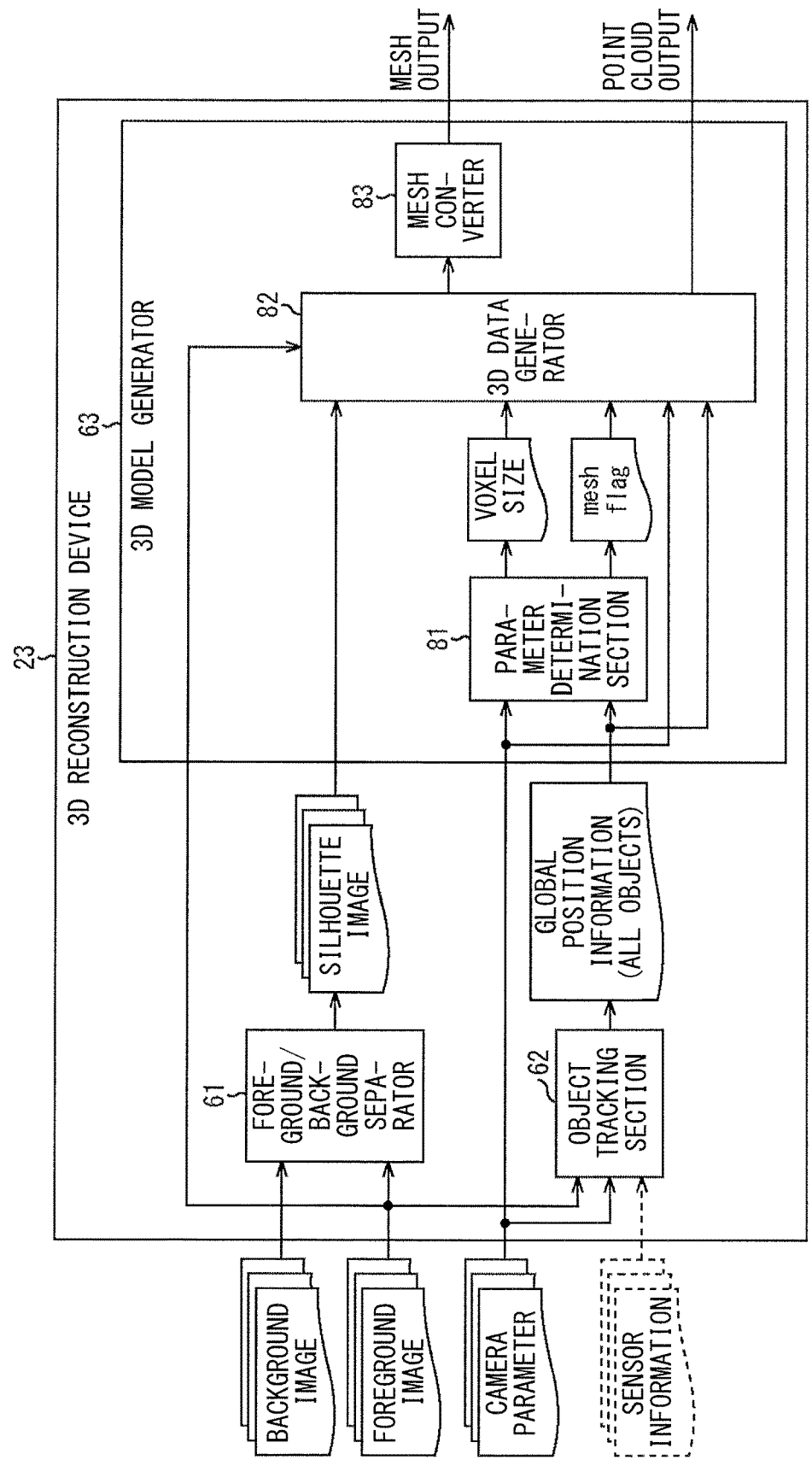

[FIG. 5]
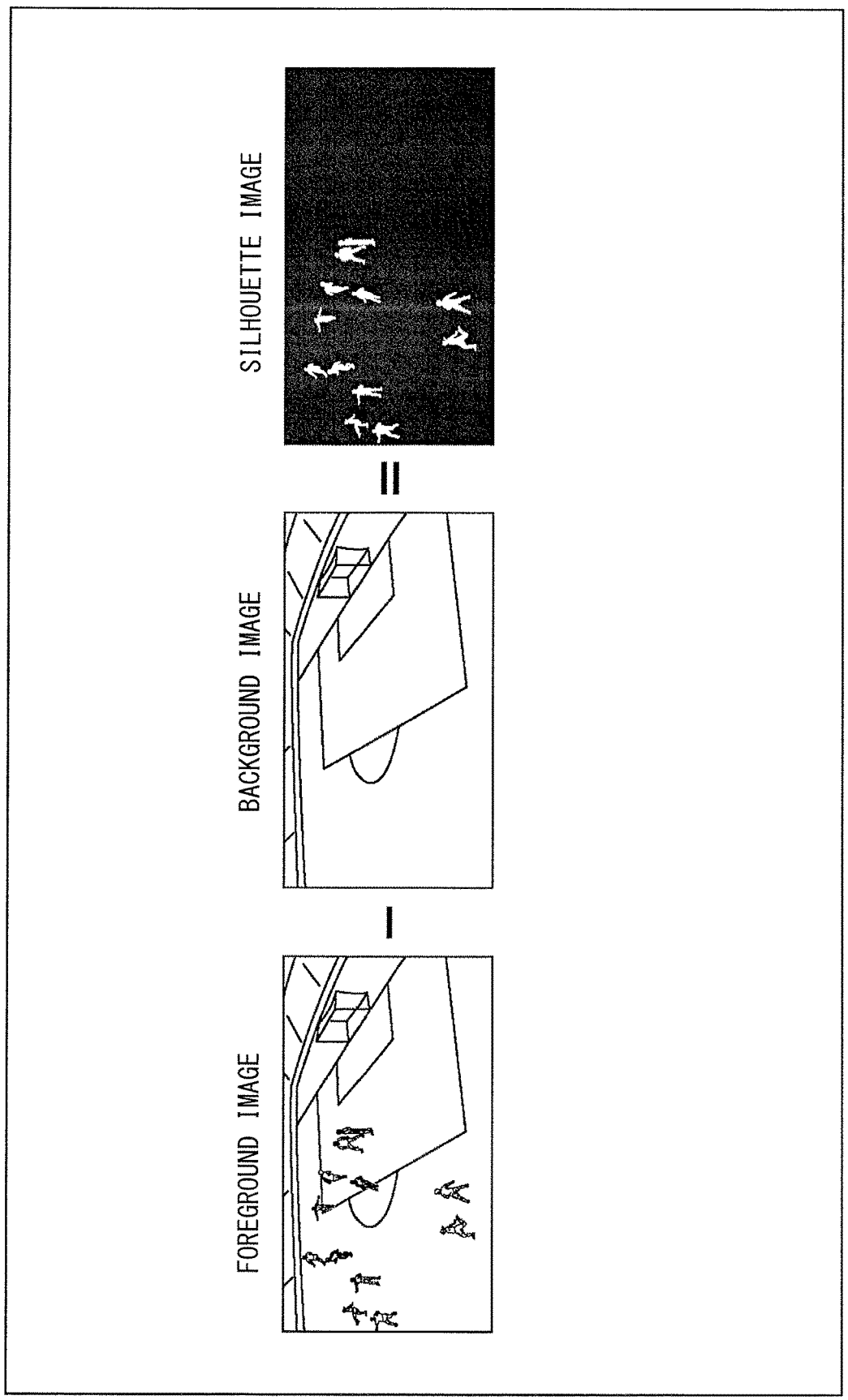

[ FIG. 6 ]
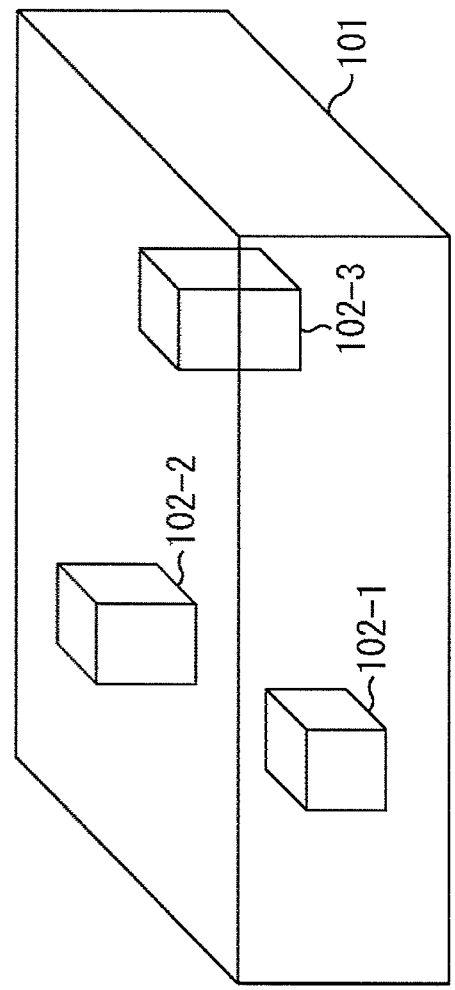

[ FIG. 7 ]
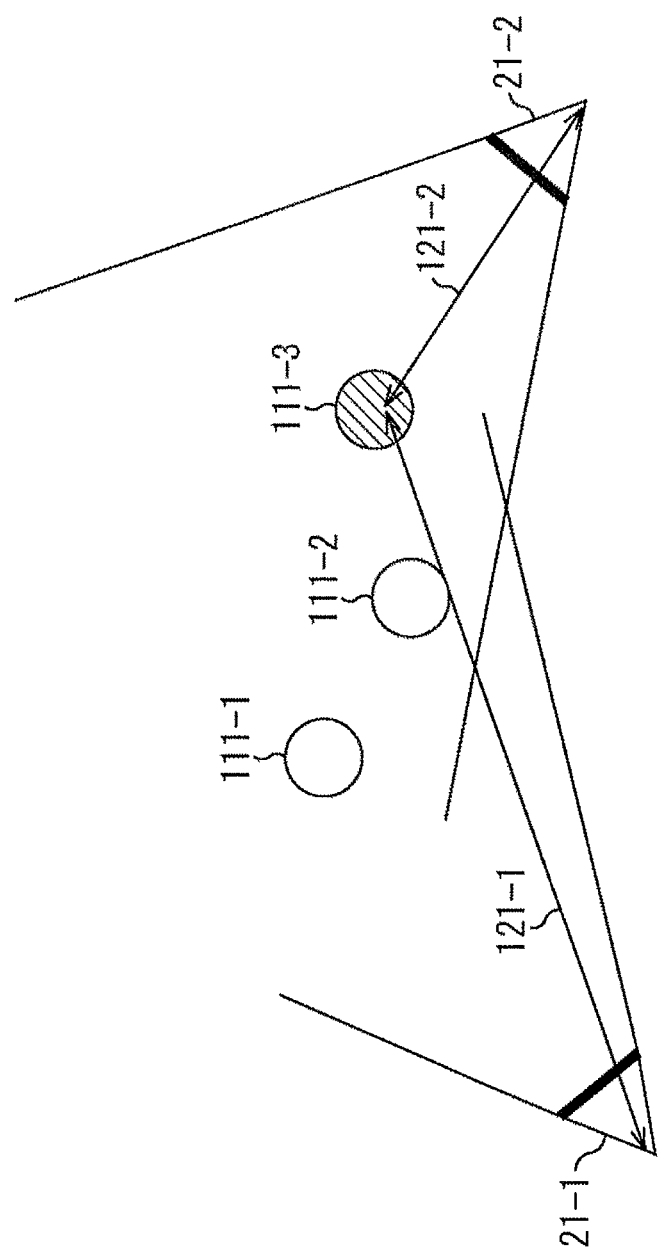

[ FIG. 8 ]
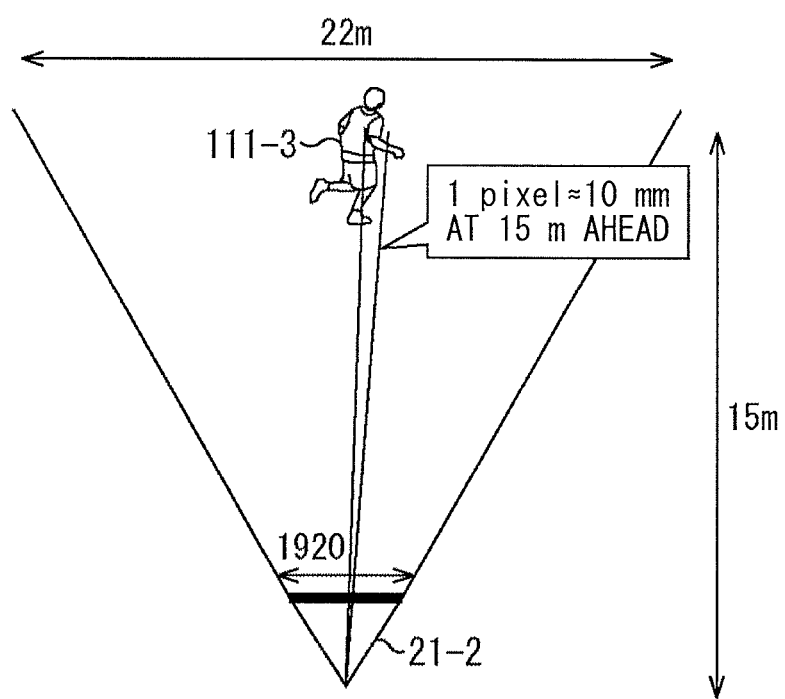

[FIG. 9]
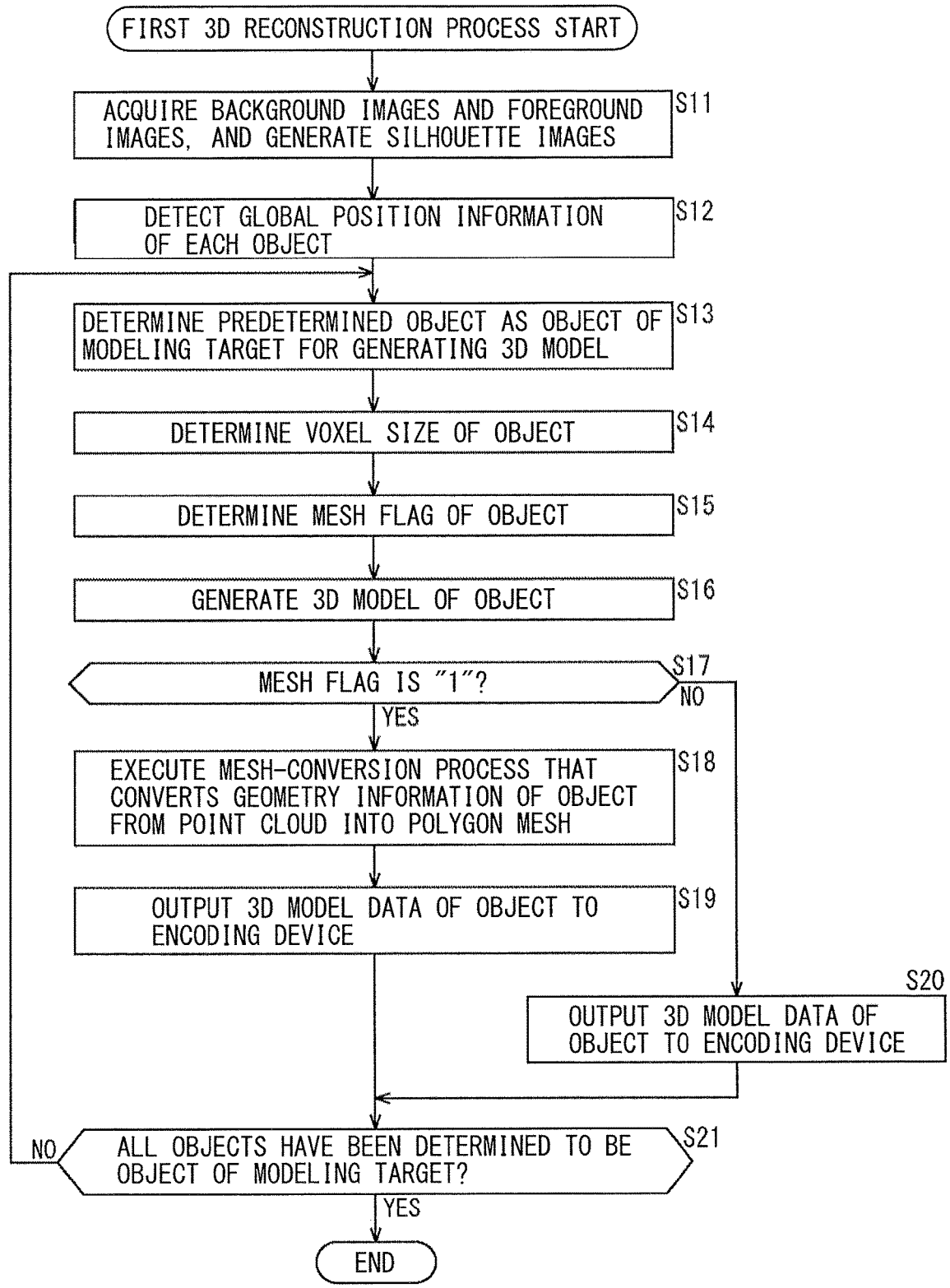

[ FIG. 10 ]
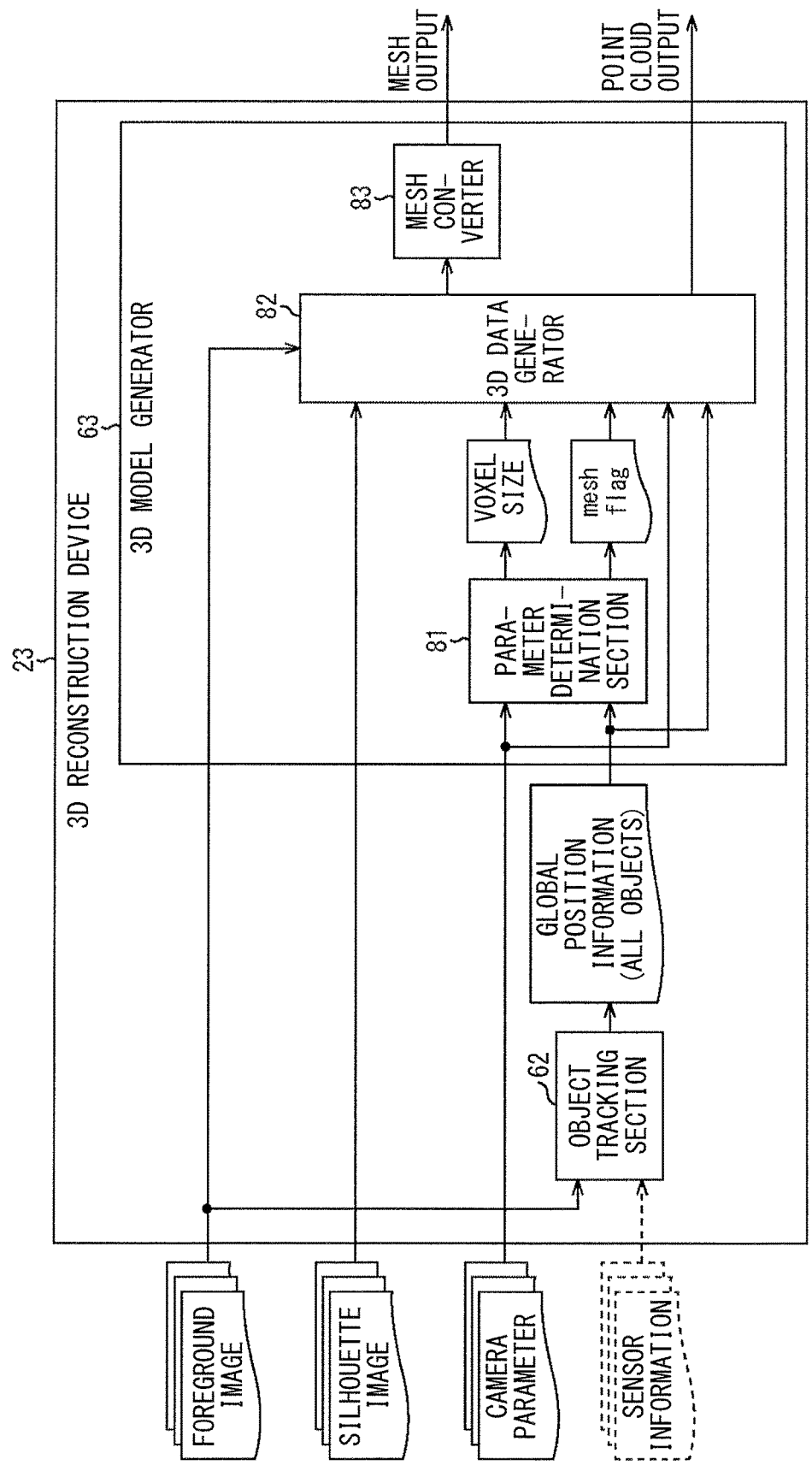

[FIG. 11]
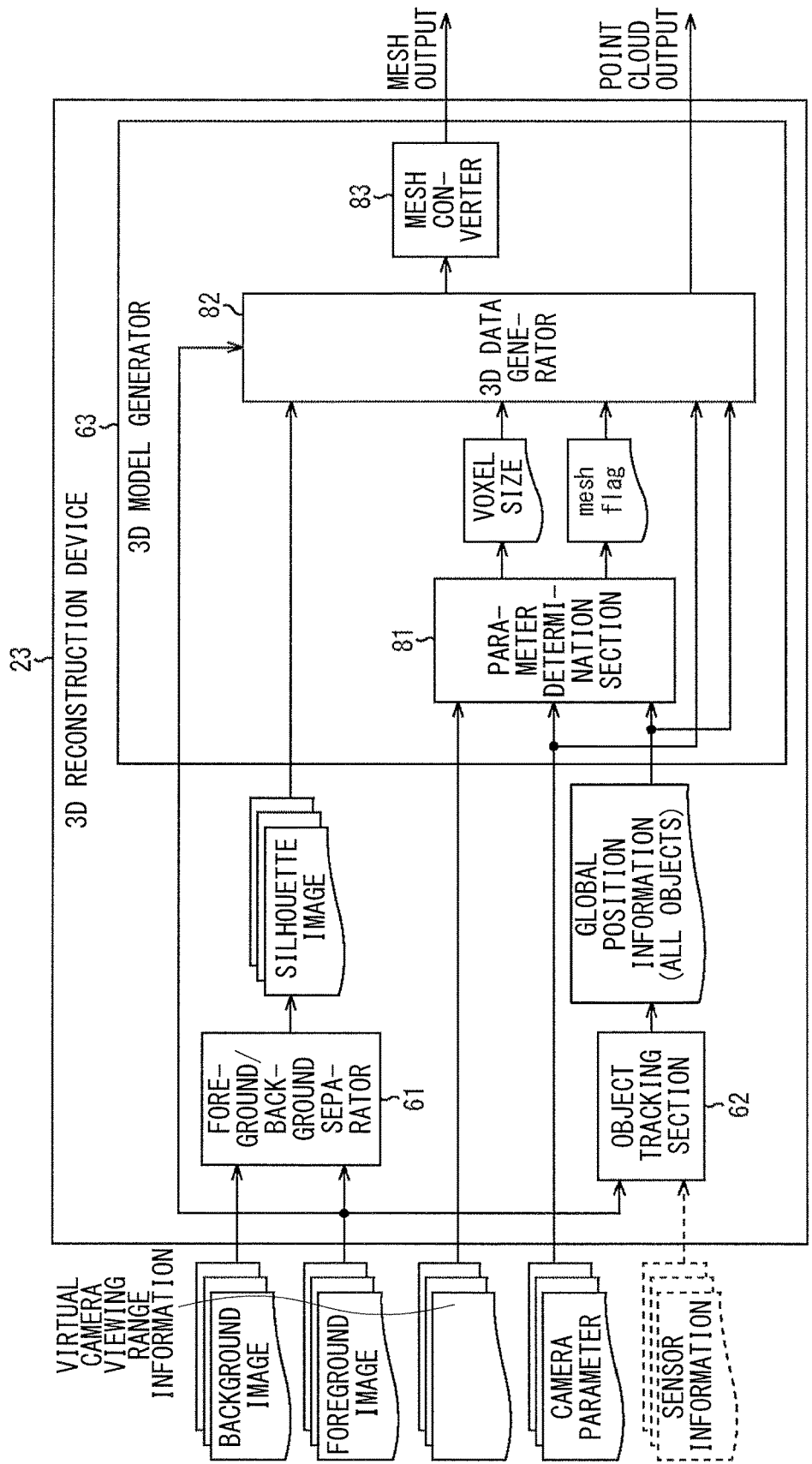

[ FIG. 12 ]
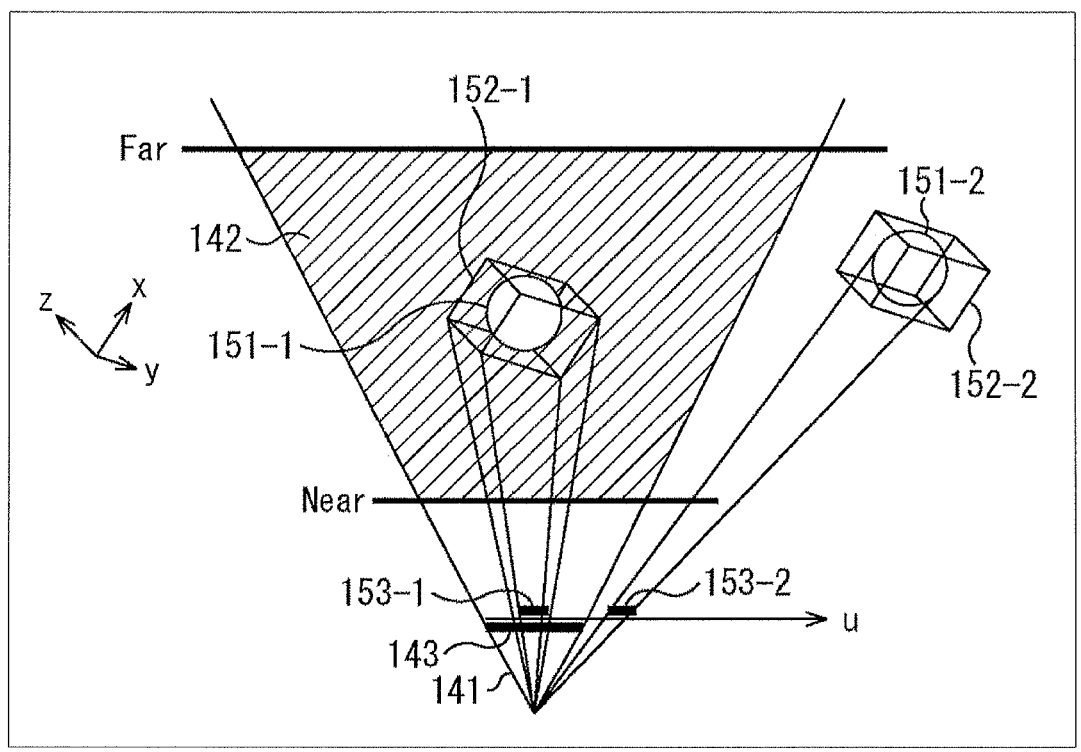

[ FIG. 13 ]
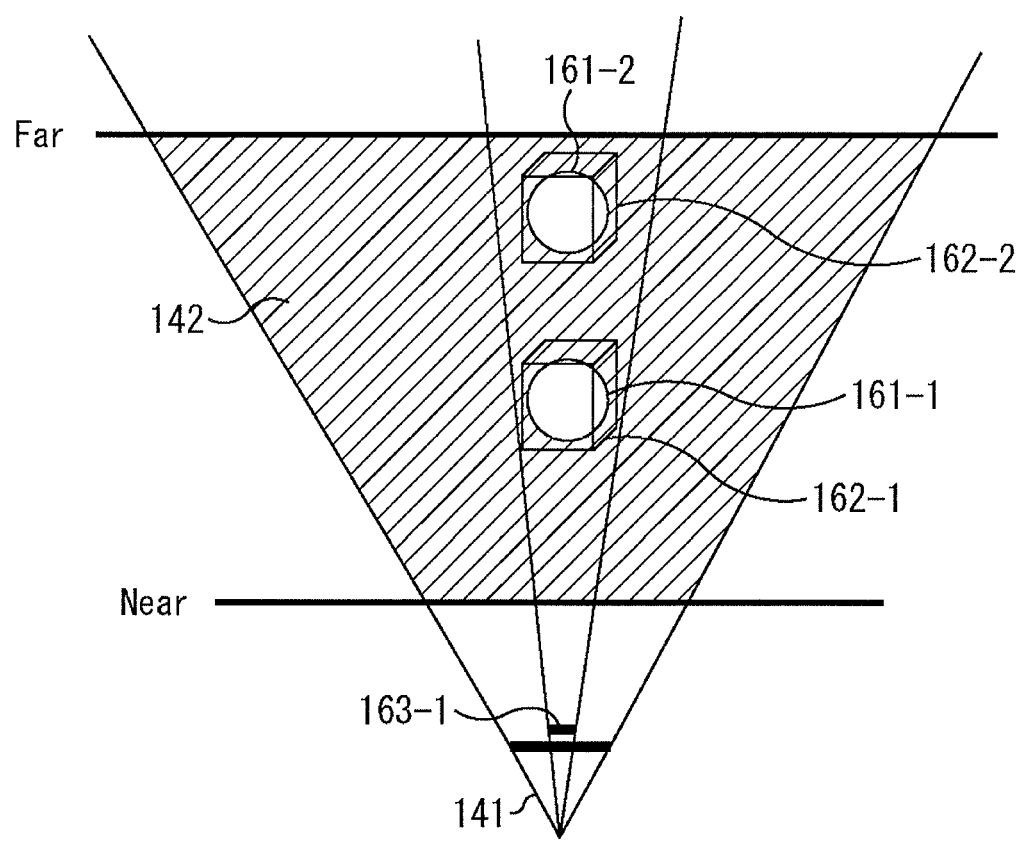

[ FIG. 14 ]
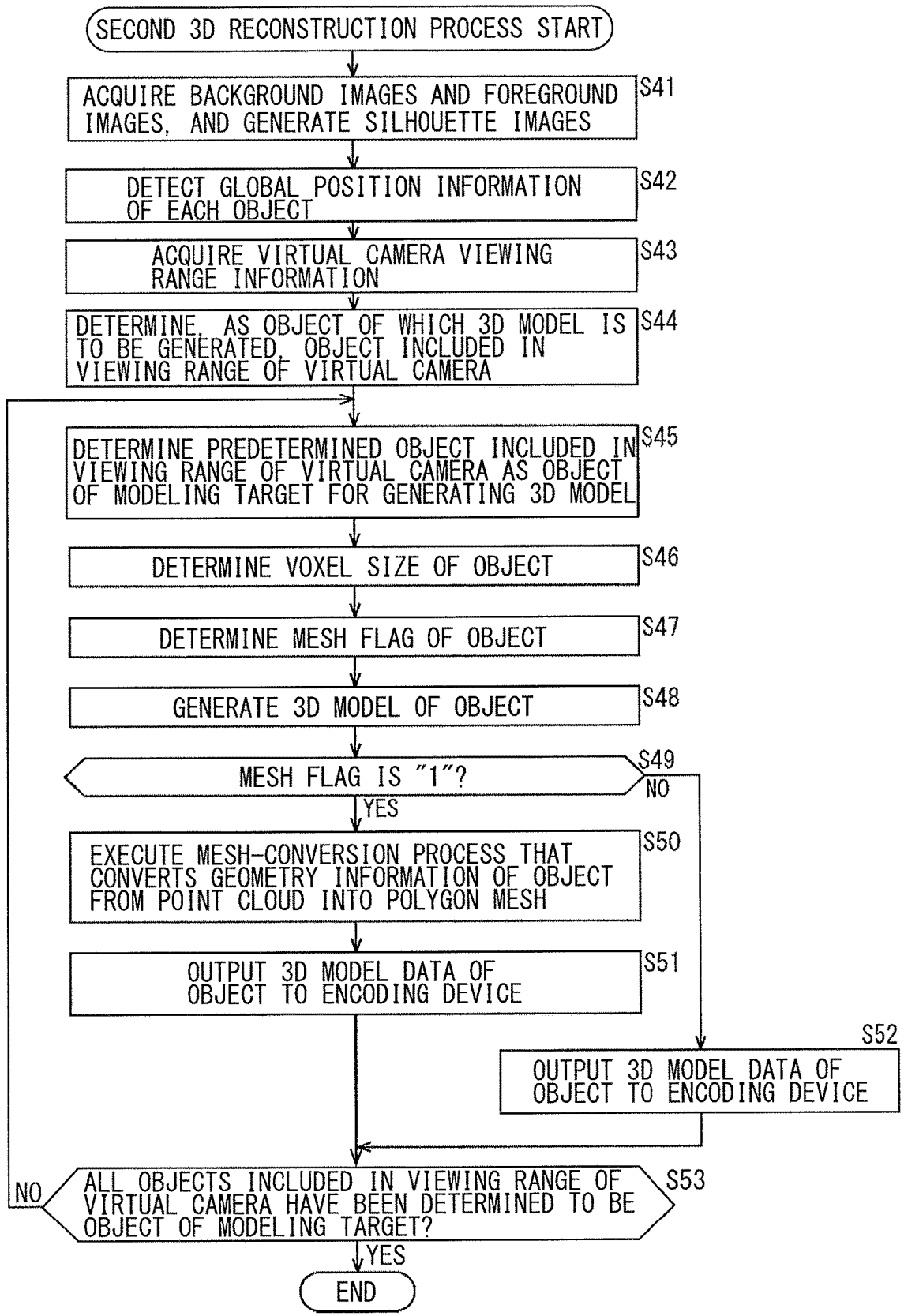

[ FIG. 15 ]
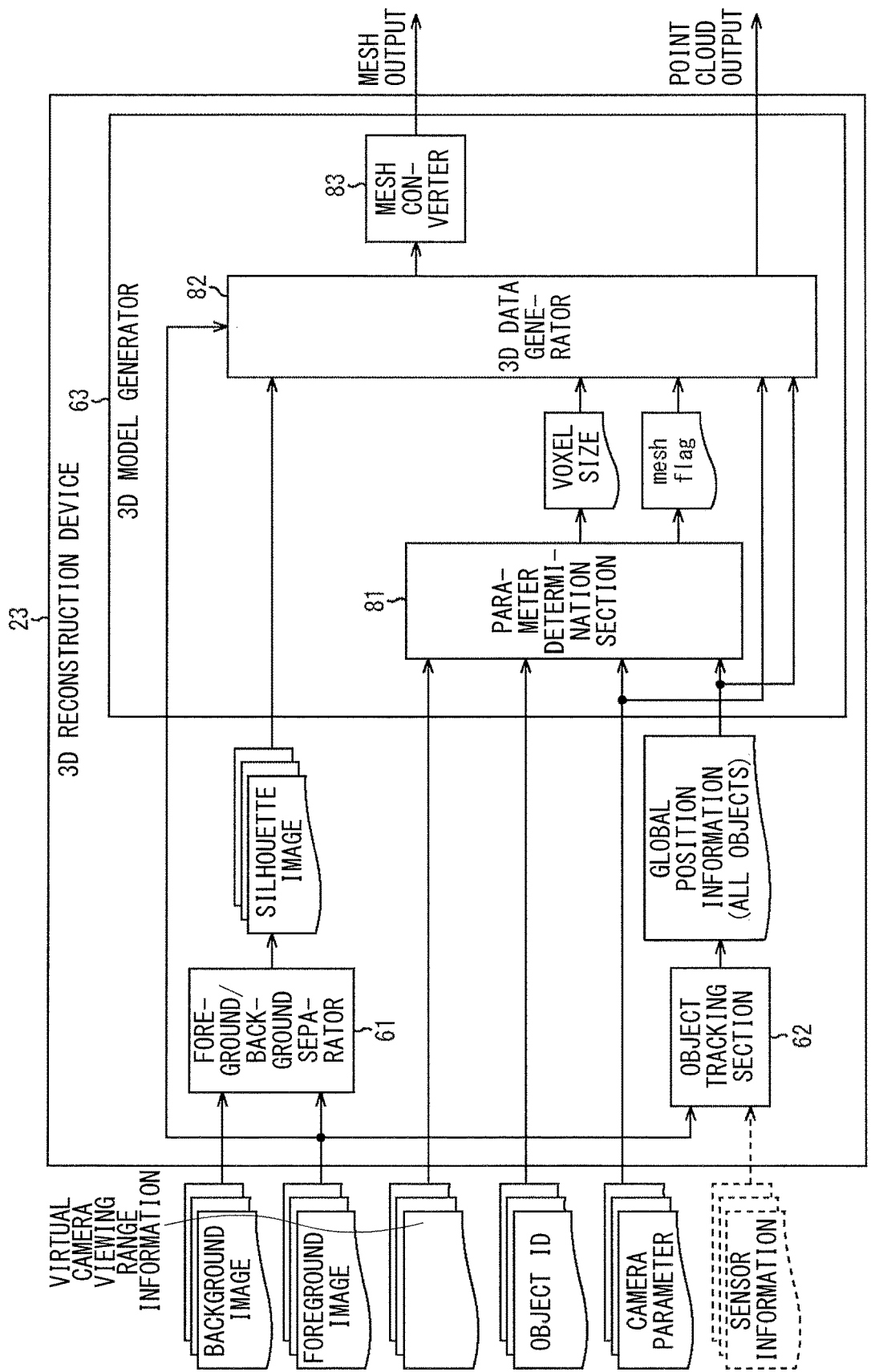

| OBJECT ID | GLOBAL POSITION INFORMATION |
|---|---|
| 0 | |
| 1 | |
| 2 | |
| 3 | |
| 4 | |
| 5 | |

B

| Bounding box | VA-LUE |
|---|---|
| xmin | |
| xmax | |
| ymin | |
| ymax | |
| zmin | |
| zmax | |

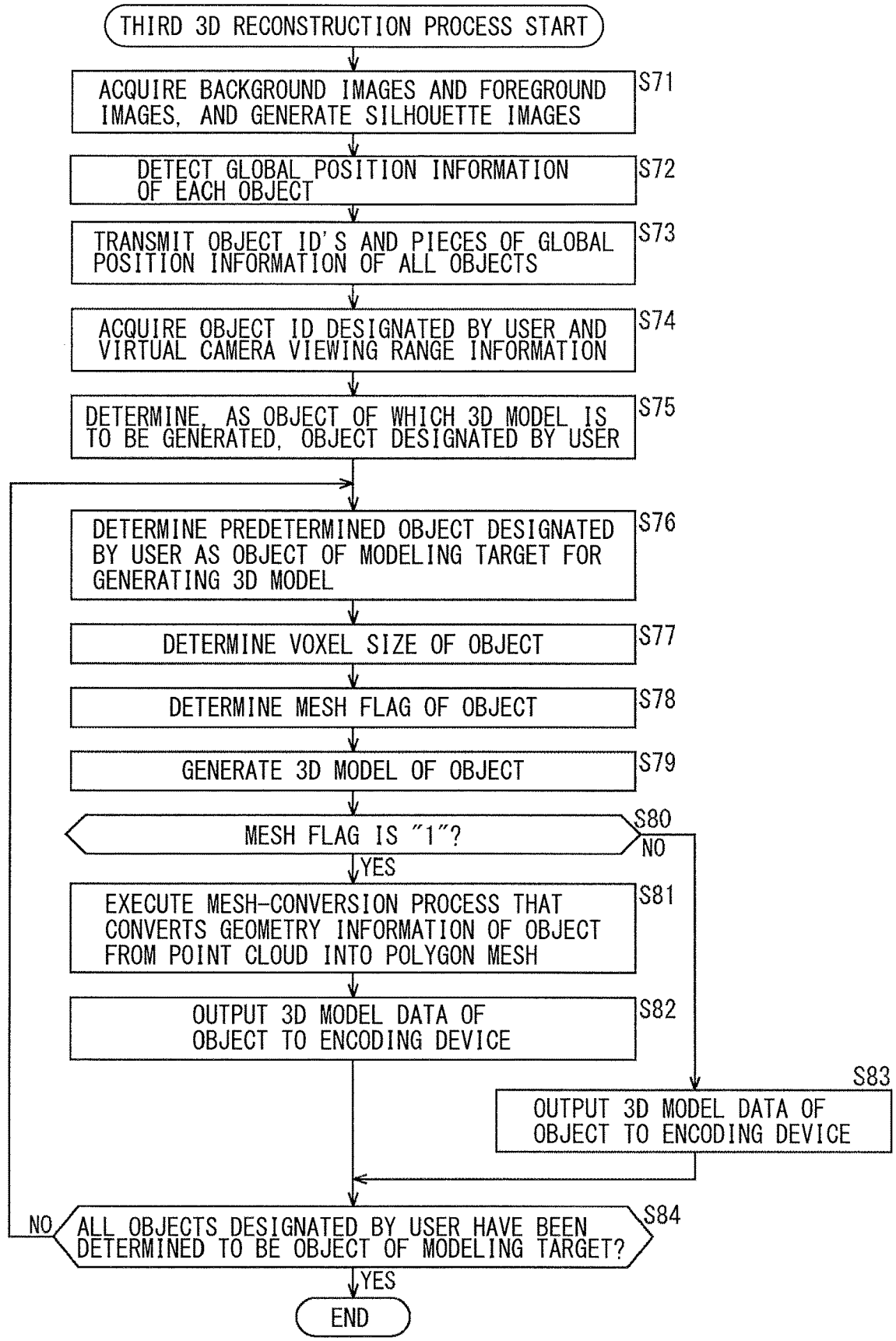
[ FIG. 17 ]

[ FIG. 18 ]

| EMBODIMENT | INFORMATION FROM REPRODUCTION DEVICE | MODELING TARGET OBJECT | CONDITIONS | MODELING METHOD | EFFECTS |
|---|---|---|---|---|---|
| FIRST EMBODIMENT | NONE | ALL OBJECTS | POSITION RELATIONSHIP BETWEEN IMAGING DEVICE AND OBJECT | CHANGE VOXEL SIZE (OBJECT CLOSE TO IMAGING DEVICE IS MODELED FINELY AND OBJECT FAR FROM IMAGING DEVICE IS MODELED COARSELY) | - POSSIBLE TO ADJUST IMAGE QUALITY AND LOAD FOR EACH OBJECT |
| | | | | SWITCH PRESENCE/ABSENCE OF MESHING (OBJECT CLOSE TO IMAGING DEVICE IS MESHED AND OBJECT FAR FROM IMAGING DEVICE IS NOT MESHED) | |
| SECOND EMBODIMENT | - VIRTUAL CAMERA VIEWING RANGE INFORMATION | OBJECTS INCLUDED IN VIEWING RANGE OF VIRTUAL CAMERA | POSITION RELATIONSHIP BETWEEN VIRTUAL CAMERA AND OBJECT | CHANGE VOXEL SIZE (OBJECT CLOSE TO VIRTUAL CAMERA IS MODELED FINELY AND OBJECT FAR FROM VIRTUAL CAMERA IS MODELED COARSELY) | - POSSIBLE TO INCREASE PROCESS SPEED AS COMPARED WITH CASE OF MODELING ALL OBJECTS |
| | | | | | - POSSIBLE TO ADJUST IMAGE QUALITY AND LOAD FOR EACH OBJECT |
| | | | | SWITCH PRESENCE/ABSENCE OF MESHING (OBJECT CLOSE TO VIRTUAL CAMERA IS MESHED AND OBJECT FAR FROM VIRTUAL CAMERA IS NOT MESHED) | |
| THIRD EMBODIMENT | - OBJECT ID DESIGNATED BY USER<br>- VIRTUAL CAMERA VIEWING RANGE INFORMATION | OBJECTS DESIGNATED BY USER | POSITION RELATIONSHIP BETWEEN VIRTUAL CAMERA AND OBJECT | CHANGE VOXEL SIZE (OBJECT CLOSE TO VIRTUAL CAMERA IS MODELED FINELY AND OBJECT FAR FROM VIRTUAL CAMERA IS MODELED COARSELY) | - POSSIBLE TO INCREASE PROCESS SPEED AS COMPARED WITH CASE OF MODELING ALL OBJECTS |
| | | | | | - POSSIBLE TO ADJUST IMAGE QUALITY AND LOAD FOR EACH OBJECT |
| | | | | SWITCH PRESENCE/ABSENCE OF MESHING (OBJECT CLOSE TO VIRTUAL CAMERA IS MESHED AND OBJECT FAR FROM VIRTUAL CAMERA IS NOT MESHED) | |

[ FIG. 19 ]
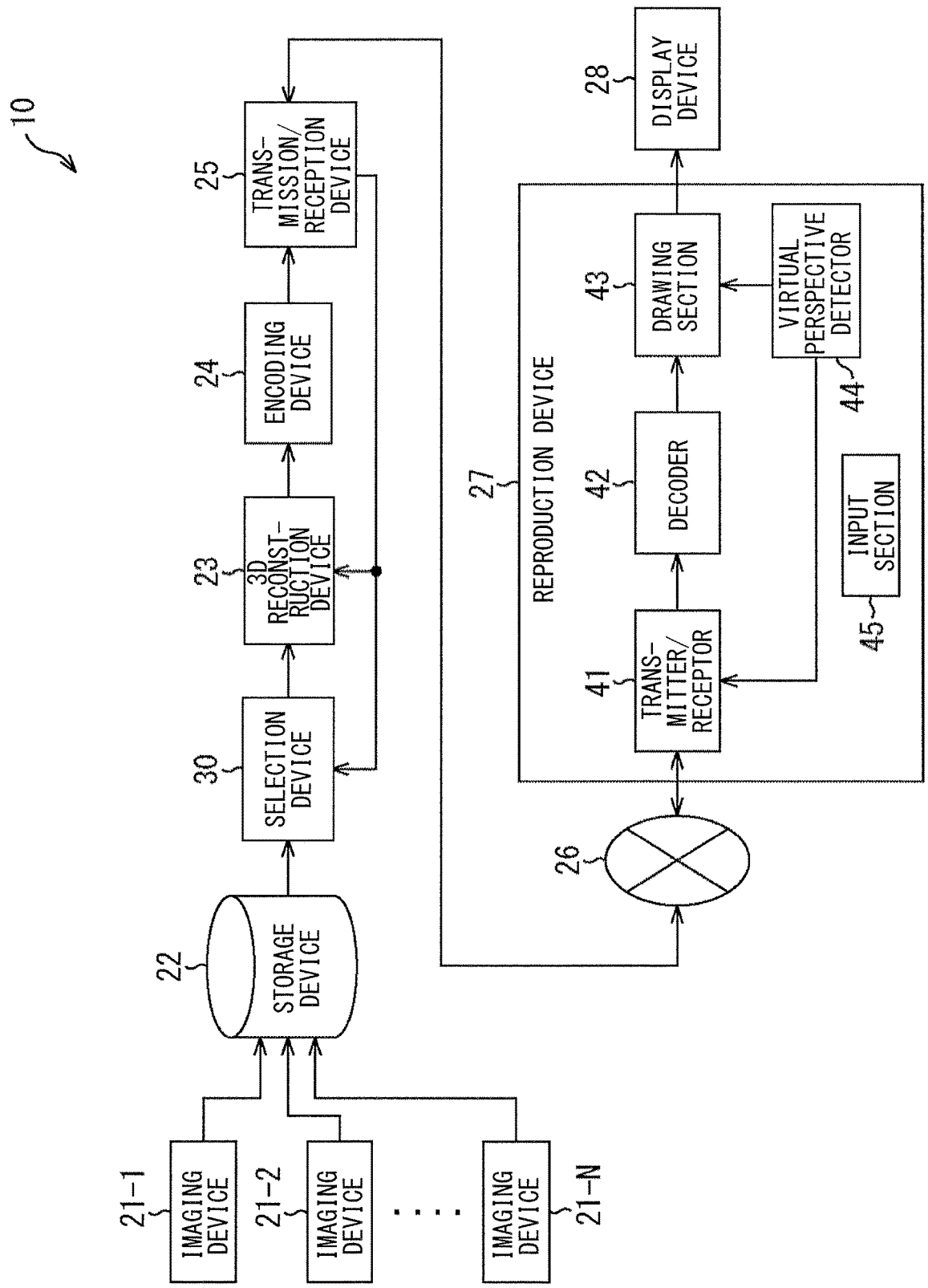

[FIG. 20]
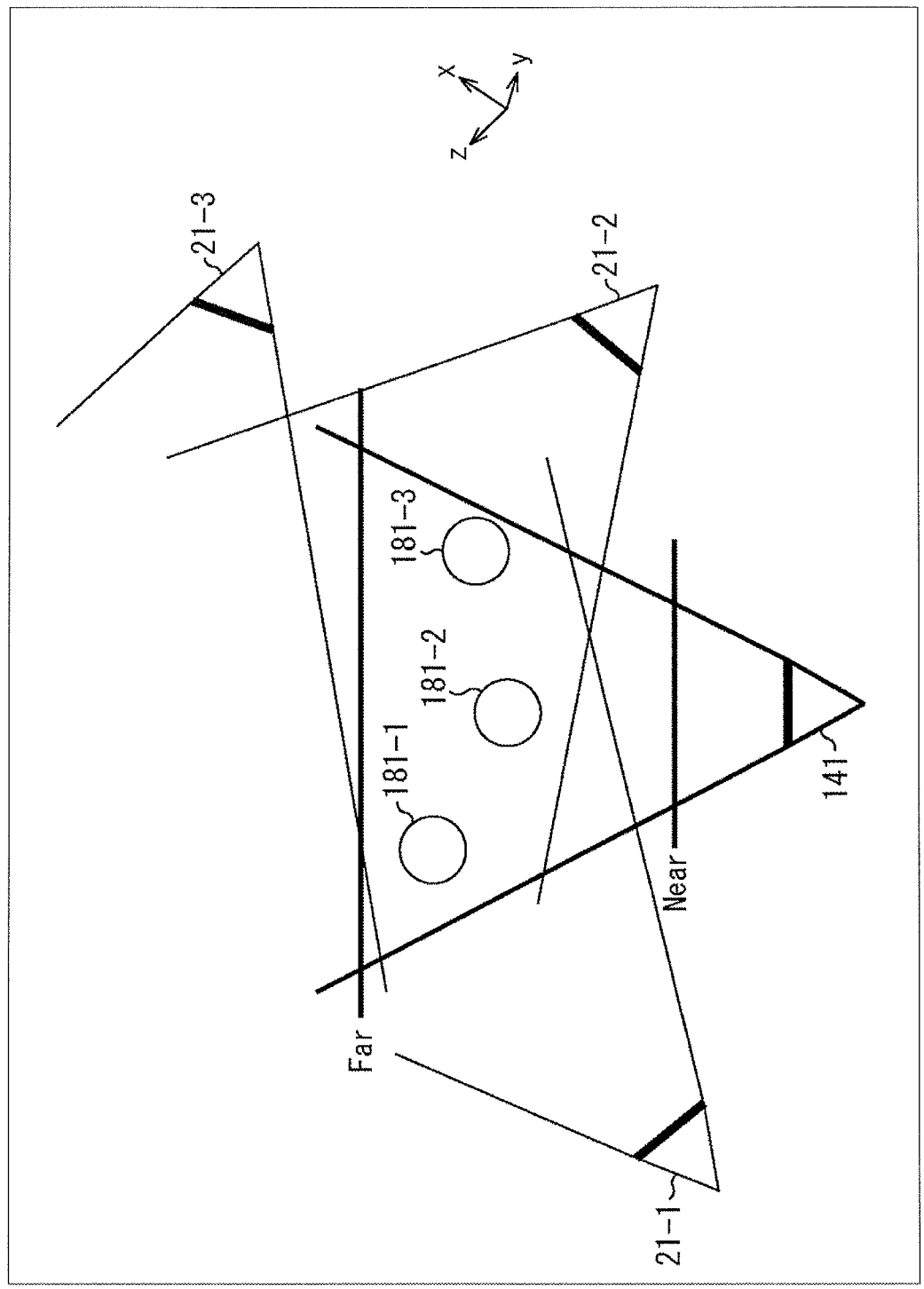

[ FIG. 21 ]
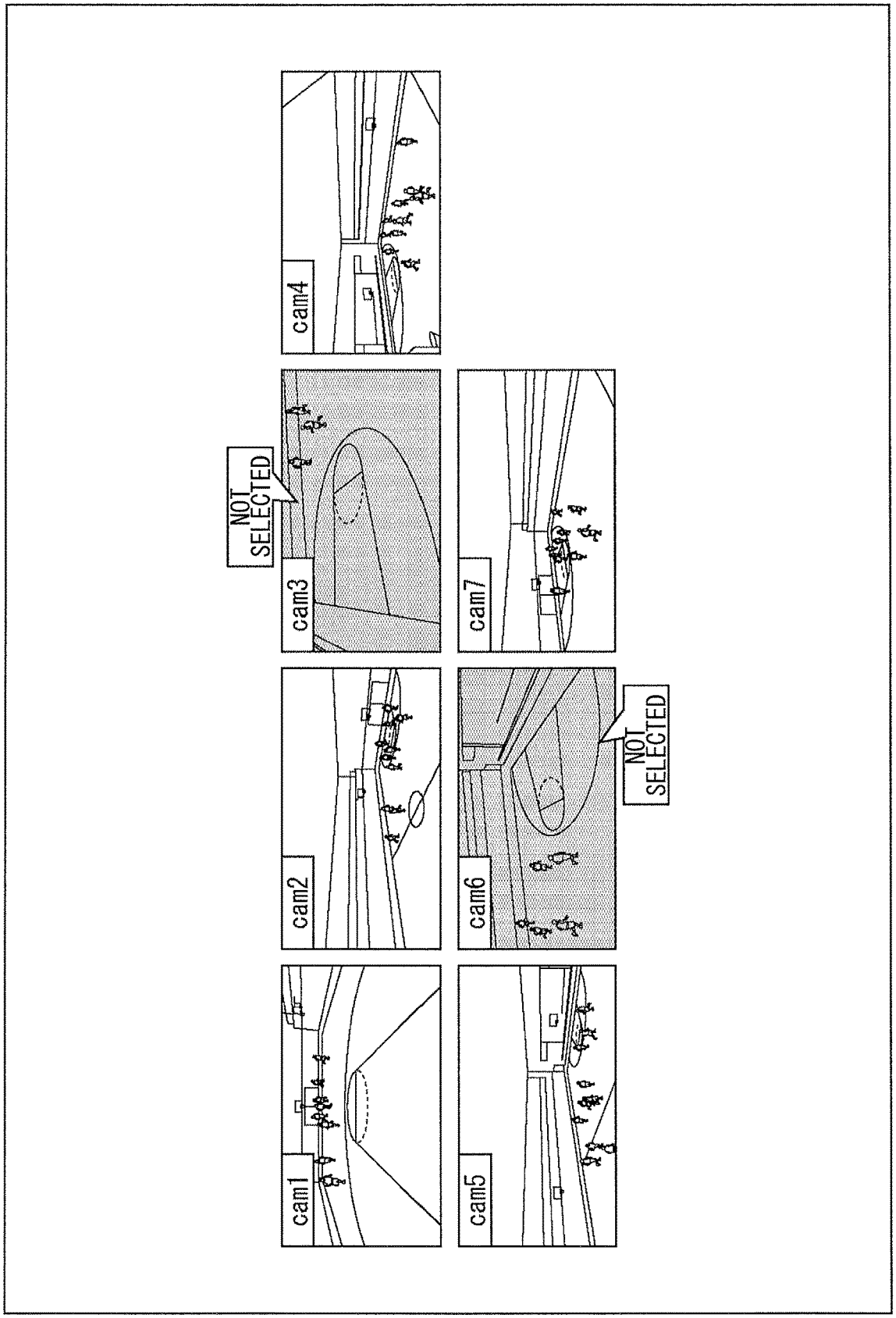

[ FIG. 22 ]
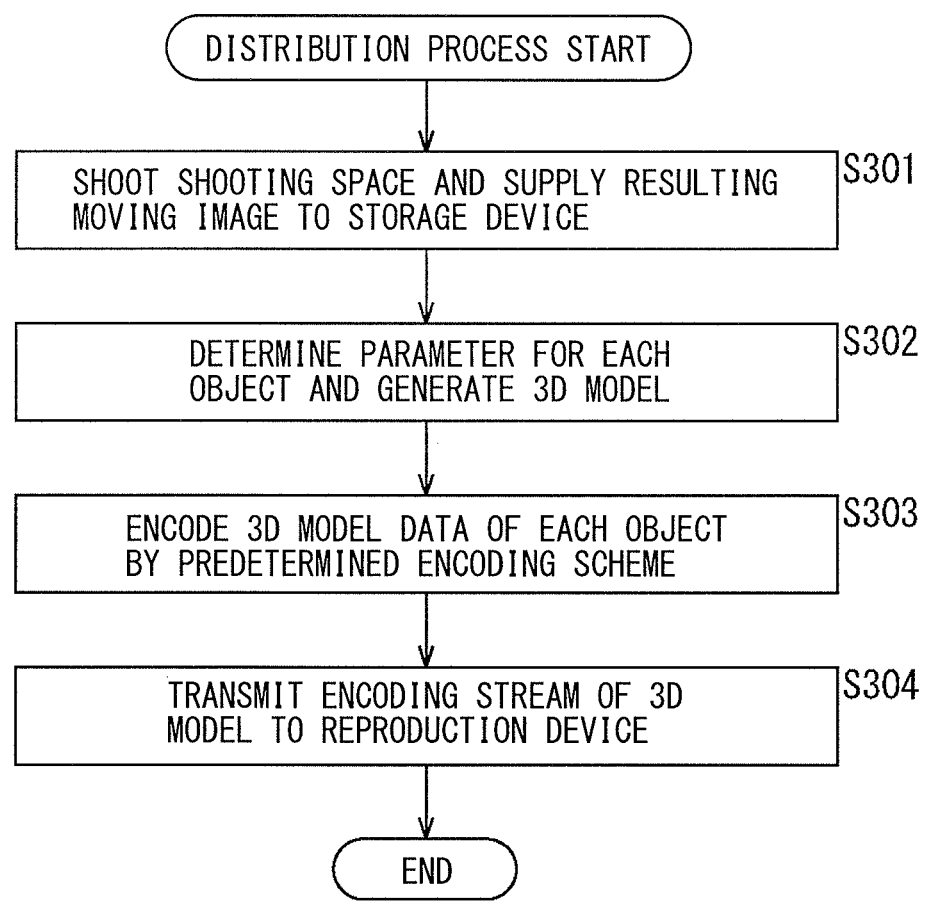

[ FIG. 23 ]
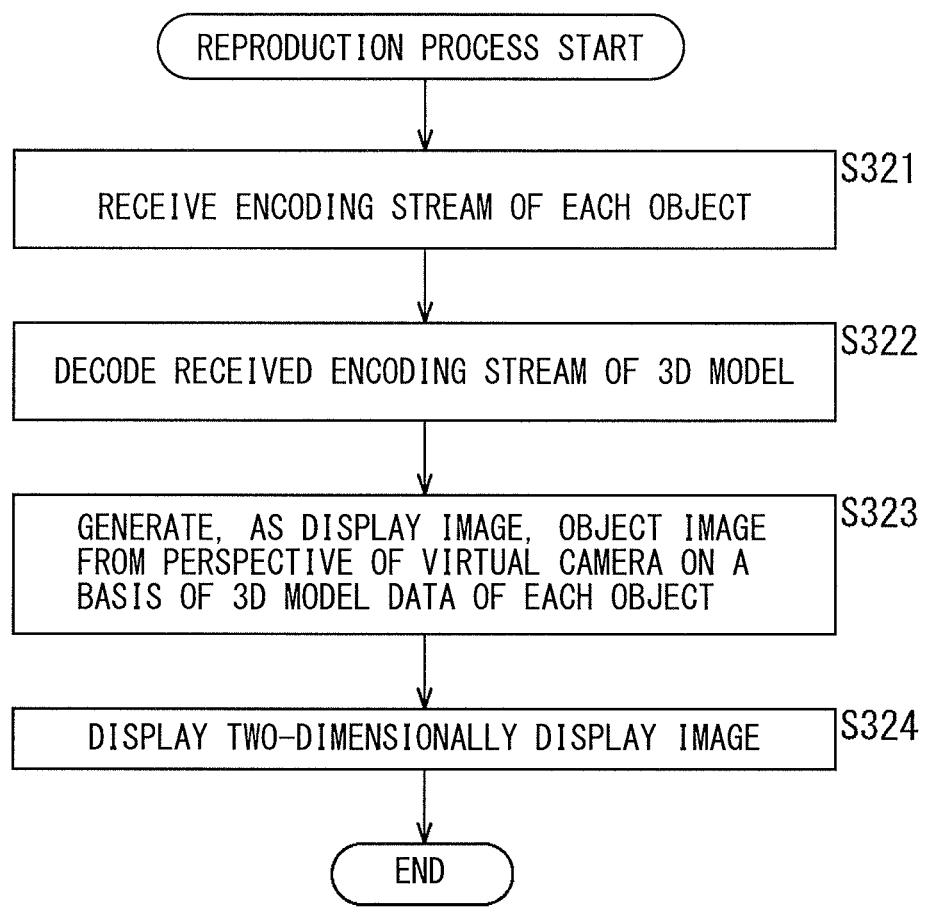

[ FIG. 24 ]
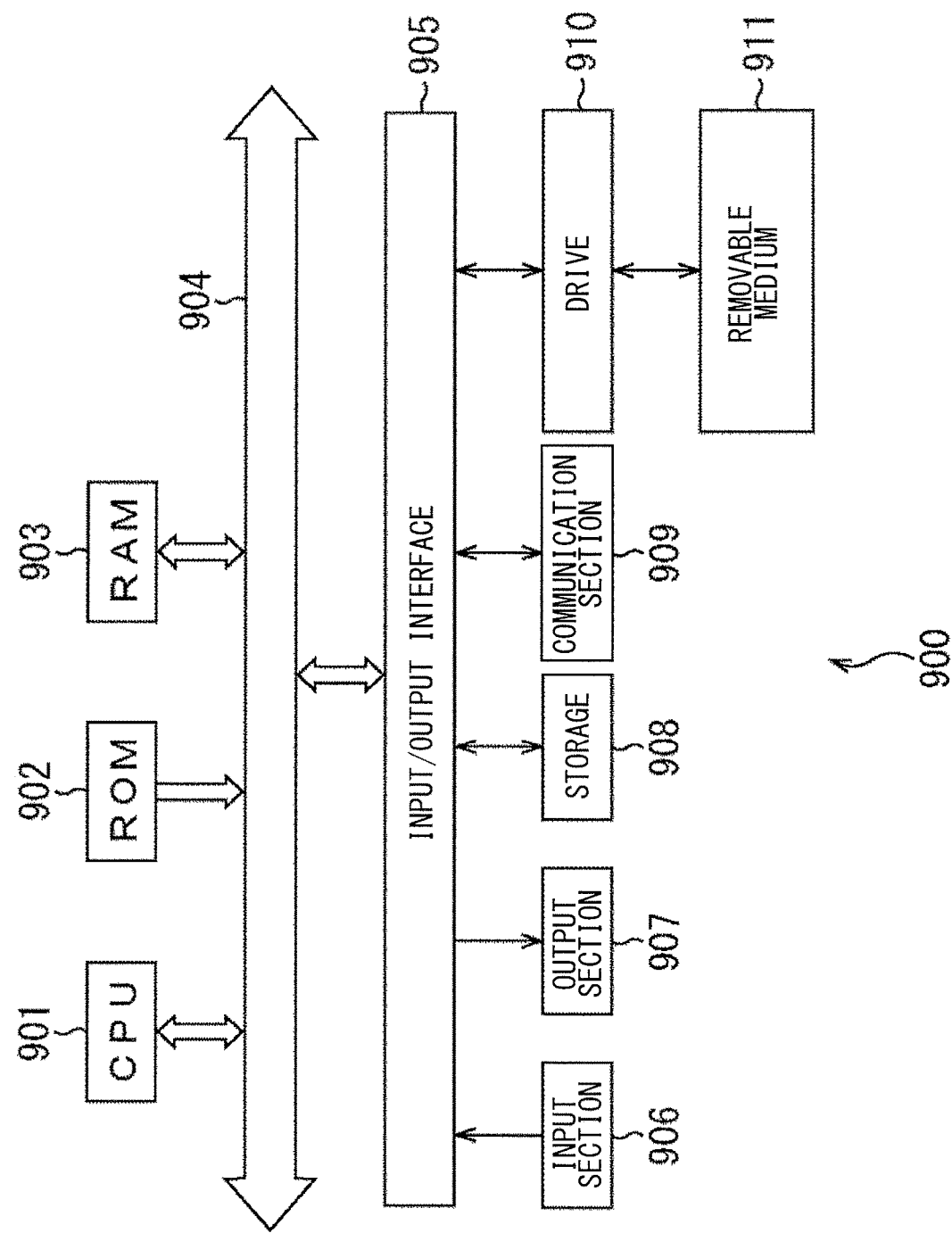

[ FIG. 25 ]
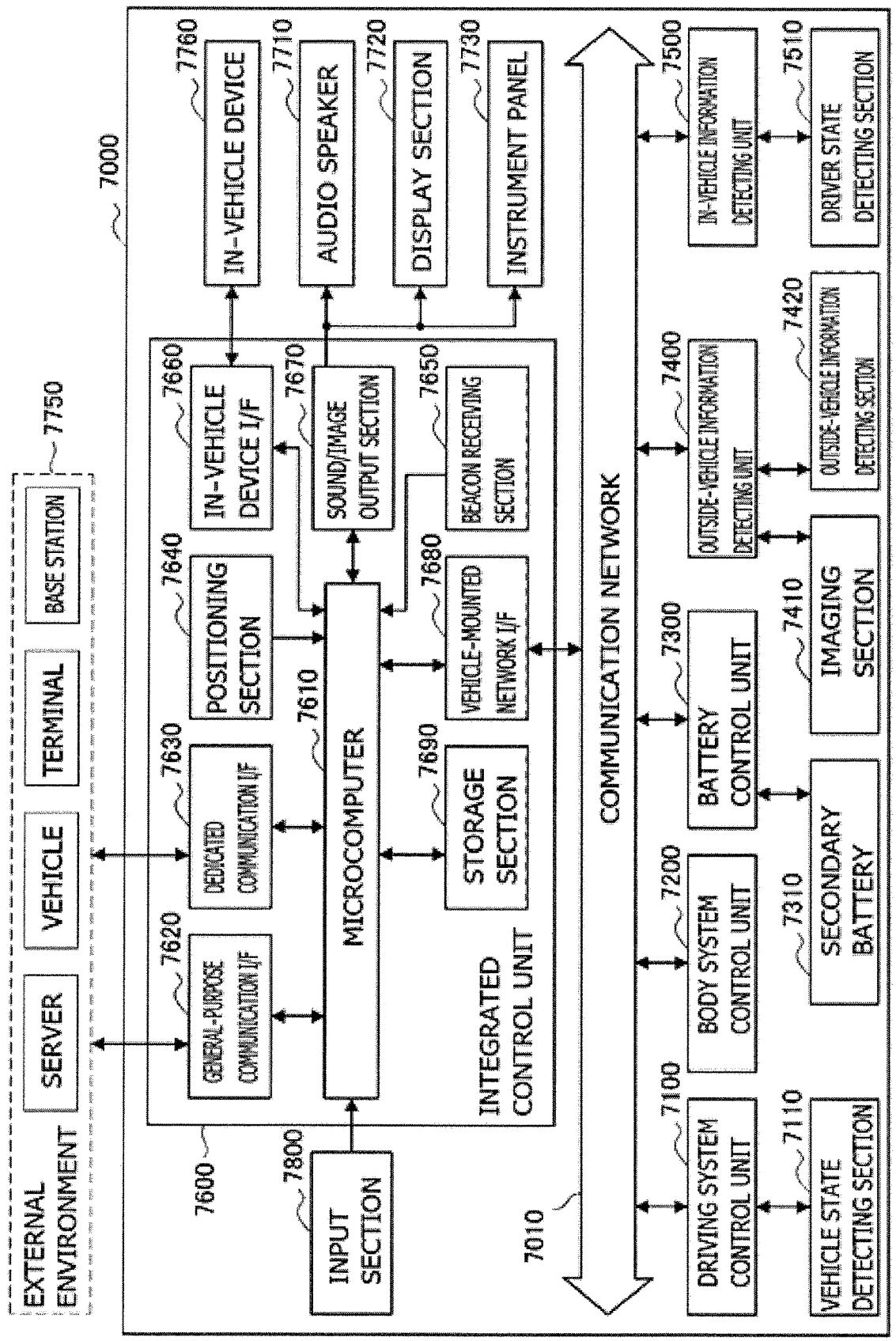

[FIG. 26]
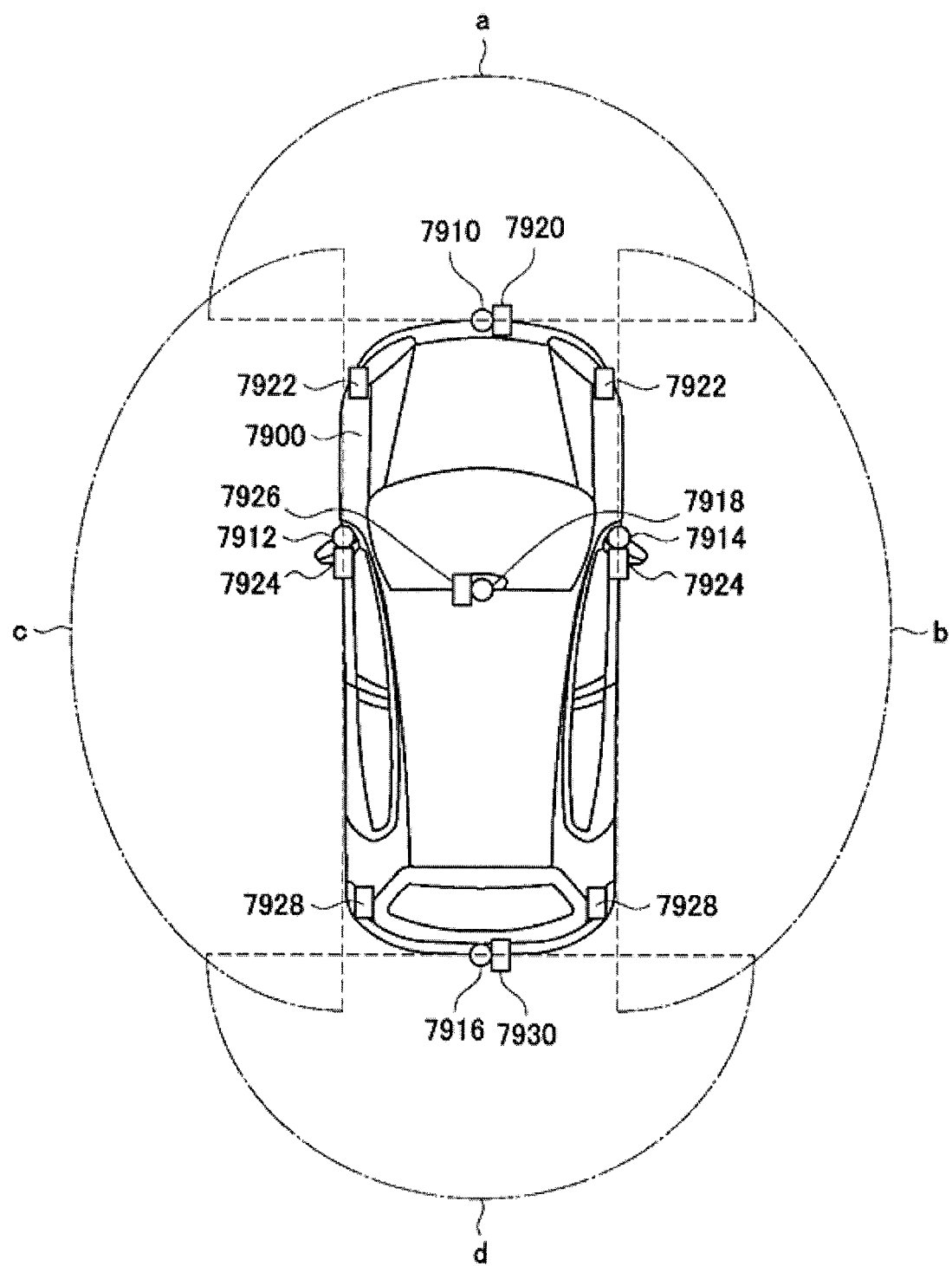

IMAGE PROCESSING DEVICE AND IMAGE PROCESSING METHOD

CROSS REFERENCE TO PRIOR APPLICATION

This application is a National Stage Patent Application of PCT International Patent Application No. PCT/JP2018/029734 (filed on Aug. 8, 2018) under 35 U.S.C. § 371, which claims priority to Japanese Patent Application No. 2017-159457 (filed on Aug. 22, 2017), which are all hereby incorporated by reference in their entirety.

TECHNICAL FIELD

The present technology relates to an image processing device and an image processing method, and more particularly to an image processing device and image processing method that make it possible to reduce a processing load in modeling a plurality of 3D objects.

BACKGROUND ART

Various modeling techniques have been proposed for modeling a three-dimensional (3D) object.

For example, PTL 1 discloses a modeling apparatus and a method in which a modeling speed of a three-dimensional image is increased by hierarchically modeling a bounding volume.

Further, for example, PTL 2 discloses a three-dimensional modeling method including creating a three-dimensional shape by using a plurality of depth images acquired by a plurality of cameras from different directions. The depth image is an image in which distance information to an object is stored as pixel values.

CITATION LIST

Patent Literature

PTL 1: Japanese Unexamined Patent Application Publication No. 2007-220121
PTL 2: Japanese Unexamined Patent Application Publication No. 2004-302524

SUMMARY OF THE INVENTION

Problems to be Solved by the Invention

In a case where a plurality of 3D objects is modeled, since a processing load becomes large, a method of reducing the processing load is desired in order to achieve high-speed modeling.

The present technology has been made in view of the above circumstances, and is able to reduce the processing load when modeling the plurality of 3D objects.

Means for Solving the Problems

An image processing device according to one aspect of the present technology includes a 3D model generator that acquires object spatial information indicating a 3D region of an object for each object, and generates a 3D model of an object for each object space.

An image processing method according to one aspect of the present technology is performed by an image processing device, and the method includes acquiring object spatial information indicating a 3D region of an object for each object, and generating a 3D model of an object for each object space.

In one aspect of the present technology, an object spatial information indicating a 3D region of an object is acquired for each object, and a 3D model of an object for each object space is generated.

It is to be noted that it is possible to realize the image processing device according to one aspect of the present technology by causing a computer to execute programs.

In order to achieve the image processing device according to the one aspect of the present technology, it is possible to provide the programs to be executed by the computer by being transmitted via a transmission medium or by being recorded on a recording medium.

The image processing device may be a separate device or may be an interior blocks that is included in a single device.

Effects of the Invention

According to one aspect of the present technology, it is possible to reduce a processing load when a plurality of 3D objects is modeled at high speed.

It is to be noted that the effects described herein are not necessarily limiting, and any of the effects described in the present disclosure may be provided.

BRIEF DESCRIPTION OF DRAWINGS

FIG. 1 is a diagram for explaining an outline of an image processing system to which the present technology is applied.

FIG. 2 is a diagram for explaining data formats of 3D model data.

FIG. 3 is a block diagram illustrating a configuration example of the image processing system to which the present technology is applied.

FIG. 4 is a block diagram illustrating a configuration example of a 3D reconstruction device according to a first embodiment.

FIG. 5 is a diagram for explaining generation of a silhouette image.

FIG. 6 is a diagram illustrating a bounding box representing a global position information of an object.

FIG. 7 is a diagram for explaining a method of determining a voxel size of a 3D model of an object.

FIG. 8 is a diagram for explaining a method of determining a voxel size of a 3D model of an object.

FIG. 9 is a flowchart for explaining a 3D reconstruction process according to the first embodiment.

FIG. 10 is a block diagram illustrating a modification example of a 3D reconstruction device according to the first embodiment.

FIG. 11 is a block diagram illustrating a configuration example of a 3D reconstruction device according to a second embodiment.

FIG. 12 is a diagram for explaining an inside of a viewing range of a virtual camera.

FIG. 13 is a diagram illustrating a process in an object of occlusion.

FIG. 14 is a flowchart for explaining a 3D reconstruction process according to the second embodiment.

FIG. 15 is a block diagram illustrating a configuration example of a 3D reconstruction device according to a third embodiment.

FIG. 16 is a diagram for explaining an object ID and global position information of an object.

FIG. 17 is a flowchart for explaining a 3D reconstruction process according to the third embodiment.

FIG. 18 is a diagram for explaining modeling methods of the 3D reconstruction devices according to the first to third embodiments.

FIG. 19 is a block diagram illustrating another configuration example of an image processing system to which the present technology is applied.

FIG. 20 is a diagram for explaining a process performed by a selection device.

FIG. 21 is a diagram for explaining a process performed by the selection device.

FIG. 22 is a flowchart illustrating a distribution process.

FIG. 23 is a flowchart illustrating a reproduction process.

FIG. 24 is a block diagram illustrating a configuration example of a computer to which the present disclosure is applied.

FIG. 25 is a block diagram depicting an example of schematic configuration of a vehicle control system.

FIG. 26 is a diagram of assistance in explaining an example of installation positions of an outside-vehicle information detecting section and an imaging section.

MODES FOR CARRYING OUT THE INVENTION

The following describes an example for implementing the present technology (which will be referred to as embodiment below). The description will be made in the following order.
1. Outline of Image Processing System
2. Configuration Example of Image Processing System
3. 3D Reconstruction Device According to First Embodiment
4. Modification Example of First Embodiment
5. 3D Reconstruction Device According to Second Embodiment
6. 3D Reconstruction Device According to Third Embodiment
7. Summary of First to Third Embodiments
8. Another Configuration Examples of Image Processing System
9. Distribution Process and Reproduction Process
10. Case of Performing Transmission in Data Format Other Than Multi-Texture Geometry Format
11. Case of Performing Transmission to Multiple Users
12. Computer Configuration Example
13. Application Example 1. Outline of Image Processing System First, referring to FIG. 1 and FIG. 2, an outline of an image processing system to which an embodiment of the present technology is applied will be described.

The image processing system to which an embodiment of the present technology is applied includes: a distribution side which generates a 3D model of an object from shot images obtained by imaging with a plurality of imaging devices, and distributes the 3D model; and a reproduction side which receives the 3D model transmitted from the distribution side, and reproduces and displays the 3D model.

In the distribution side, a plurality of shot images is obtained by imaging a predetermined shooting space with the plurality of imaging devices from an outer periphery thereof. The shot image includes, for example, a moving image. The shooting space may be outdoors such as a football playing field, as illustrated in FIG. 1, or may be indoors.

Each imaging device includes a distance measurement device, and is able to measure, in addition to texture information of a subject, a distance to the subject. Further, the shot images and the pieces of distance information obtained from the plurality of imaging devices from different directions are used to generate a plurality of 3D models of the objects that is to be display targets in the shooting space. The generation of the 3D model of the object is referred to as reconstruction of 3D model for the following reasons: the texture information and the distance information of overlapping regions are summarized from the plurality of shot images and the distance information obtained by the plurality of imaging devices with respect to a single object; and the texture information and the distance information of a region which become a blind spot in one imaging device are reconstructed by being supplemented by the texture information and the distance information obtained by another imaging device.

In FIG. 1, for example, in an example in which a shooting space is set in a field of a soccer stadium, a player or the like on the field is imaged by the plurality of imaging devices disposed on a stand-side which is an outer periphery of the field. By the reconstruction of the 3D model, for example, a player, a trial, a soccer ball, and the like on the fields are extracted as objects, and a 3D model is generated (reconstructed) for each object.

The shot images obtained by imaging with the plurality of imaging devices are stored in a predetermined storage device. Data of the 3D model of each object (hereinafter also referred to as 3D model data) is obtained by using the plurality of shot images of the different directions stored in the storage device is generated. A data format of the 3D model data will be described later referring to FIG. 2.

The 3D model(s) of one or more objects out of a large number of objects present in the shooting space is(are) transmitted in response to a request from the reproduction side, and is(/are) reproduced and displayed on the reproduction side.

It is also possible for the reproduction side to request only an object of a viewing target out of the large number of objects present in the shooting space, and to cause the display device to display the object. For example, the reproduction side assumes a virtual camera in which a viewing range of a viewer is a shooting area, requests only an object captured by the virtual camera from a large number of objects present in the shooting space, and causes the display device to display the object. It is possible to set a perspective of the virtual camera to any position so that the viewer is able to view the fields from any perspective in the real world.

FIG. 2 illustrates an example of data formats of the 3D model data.

The 3D model data may take various data formats.

One data format is a form in which geometry information (shape information) of the object is represented by a set of points (point cloud) at three-dimensional positions of the object and color information of the object is held corresponding to the respective points. In this format, one piece of geometry information and one piece of color information are held for one object. In the present embodiment, this format is described as a point cloud format.

Another form of the data format is a form in which the geometry information of the object is represented by a set of points (point cloud) similar to the above-mentioned point cloud format or by connections between vertices called a polygon mesh, and color information of the object is held in a shot image (two-dimensional texture image) captured by each imaging device. This format holds, for one object, color information including one piece of geometry information and shot images (two-dimensional texture images) the number of which is equal to the number of imaging devices. In the present embodiment, this format is described as a multi-texture geometry format.

Yet another form of the data format is a form in which the geometry information of the object is represented by the polygon mesh and the color information of the object is held in association with each polygon mesh. The two-dimensional texture image serving as the color information to be attached to each polygon mesh is represented by a UV-coordinate system. This format holds, for one object, color information including one piece of geometry information and one two-dimensional texture image. In the present embodiment, this format is described as a UV texture geometry format. The UV texture geometry format is a format standardized by MPEG-4 AFX (Animation Framework eXtension).

Yet another form of the data format is a form in which: the geometry information of the object is represented by distance information corresponding to the shot image captured by each imaging device; and the color information of the object is held in the shot image (two-dimensional texture image) captured by each imaging device. In the distance information corresponding to the shot image captured by each imaging device, a depth image is employed in which a distance in a depth direction to the subject is stored as a depth value in association with each pixel of the shot image. This format holds, for one object, color information including: geometry information including depth images the number of which is equal to the number of imaging devices; and shot images (two-dimensional texture images) the number of which is equal to the number of imaging devices. In the present embodiment, this format is described as a multi-texture depth format. An advantage of the multi-texture depth format is that it is possible to use an AVC (Advanced Video Coding) method, an HEVC (High Efficiency Video Coding method, and the like as they are as an encoding method when the 3D model data is transmitted, and to compress the 3D model data highly efficiently.

The point cloud format and the UV texture geometry format are view-independent formats in which the color information is the same regardless of the position (virtual perspective) of the virtual camera.

In contrast, the multi-texture geometry format and the multi-texture depth format are view dependent formats in which the color information can vary depending on the position (virtual perspective) of the virtual camera.

Among the various data formats of the 3D model data as described above, which data format is to be employed is optional. The reproduction side may designate the data format, or the distribution side may determine the data format. Further, the data format may be determined in advance for each application.

2. Configuration Example of Image Processing System

FIG. 3 is a block diagram illustrating a configuration example of the image processing system to which the present technology is applied.

An image processing system 10 illustrated in FIG. 3 includes, as the distribution side described with reference to FIG. 1, imaging devices 21-1 to 21-N (N>1), a storage device 22, a 3D reconstruction device (image processing device) 23, an encoding device 24, and a transmission/reception device 25.

Further, the image processing system 10 includes, as the reproduction side described with reference to FIG. 1, a reproduction device 27 and a display device 28. The transmission/reception device 25 of the distribution side and the reproduction device 27 of the reproduction side are coupled via a network 26.

The imaging devices 21 (imaging devices 21-1 to 21-N) are disposed at predetermined positions on an outer periphery of a predetermined shooting space, image the shooting space, supply the resulting moving images to the storage device 22, and cause the moving images to be stored in the storage device 22.

The imaging device 21 is equipped with a distance measurement device, is able to measure, in addition to texture image (texture information) of a subject, a distance to the subject, also generates a moving image of a depth image from the same perspective as the texture image, and supplies the storage device 22 with the moving image.

Each of the imaging devices 21-1 to 21-N is located at a different location and images the shooting space from a direction different from the other imaging device 21. The position of each imaging device 21 on the world coordinate system is known, and camera parameters (external parameter and inner parameter) of each imaging device 21 are also supplied to the storage device 22.

In preparation for transmitting a 3D model of an object to the reproduction side, the imaging device 21 captures, as a background image, an image of the shooting space in a state in which a movable object is absent, and stores the captured image in the storage device 22. The background image does not have to be a moving image, and may be a still image. Therefore, the background images the number of which is equal to the number (N) of imaging devices 21 are stored in the storage device 22.

The storage device 22 stores the moving image of the texture image and the depth image in the shooting space obtained in each of the plurality of imaging devices 21. The storage device 22 also stores the background images the number of which is equal to the number (N) of imaging devices 21 and camera parameters of the respective imaging devices 21. Hereinafter, the texture image included in the moving image captured by each of the plurality of imaging devices 21 may be described as a foreground image, being distinguished from the background image captured in advance.

The 3D reconstruction device 23 generates the 3D model for each of the large number of objects present in the shooting space by using the moving image of the texture image and the depth image in the shooting space obtained in each of the plurality of imaging devices 21 and stored in the storage device 22, and supplies data of the generated 3D model of each object to the encoding device 24.

In the present embodiment, it does not matter which subject among the subjects in the shooting space displayed on the moving image captured by the plurality of imaging devices 21 is used as a target object of which the 3D model is to be generated. The object of the target may be determined in any manner. A predetermined subject displayed on the moving image is determined as the object and is appropriately separated from other objects, and the 3D model is generated.

In the image processing system 10, information indicating a viewing range of a user in the shooting space and information indicating an object that the user is interested in may be transmitted as the viewing information of the user from the reproduction device 27. In this case, the 3D reconstruction device 23 acquires the viewing information of the user transmitted from the reproduction device 27 via the transmission/reception device 25, generates the 3D model of the object according to the viewing information of the user, and supplies data of each generated 3D model of the object to the encoding device 24. The viewing information of the user is not indispensable in the image processing system 10, and the reproduction device 27 may not necessarily transmit the viewing information to the 3D reconstruction device 23.

The encoding device 24 encodes the 3D model data of a predetermined object supplied from the 3D reconstruction device 23 by a predetermined encoding scheme, for example, an AVC scheme, an HEVC scheme, or the like. An encoding stream of the 3D model obtained by encoding is supplied to the transmission/reception device 25.

The transmission/reception device 25 transmits the encoding stream of the 3D model supplied from the encoding device 24 to the reproduction device 27 via the network 26. In a case where the viewing information of the user is transmitted from the reproduction device 27, the transmission/reception device 25 supplies the viewing information of the user to the 3D reconstruction device 23.

It is to be noted that the storage device 22, the 3D reconstruction device 23, the encoding device 24, and the transmission/reception device 25 of the distribution side may be configured individually, or may have a configuration in which two or more devices are integrated. For example, as indicated by a broken line in FIG. 3, the storage device 22, the 3D reconstruction device 23, the encoding device 24, and the transmission/reception device 25 may configure one distribution device. The storage device 22, the 3D reconstruction device 23, the encoding device 24, and the transmission/reception device 25 configure a storage, a 3D reconstruction section, an encoder, and a transmitter/receptor, respectively, of the distribution device.

The network 26 includes, for example, the Internet, a telephone network, a satellite communication network, and a leased line network such as various LAN (Local Area Network), WAN (Wide Area Network), or IP-VPN (Internet Protocol-Virtual Private Network) including Ethernet (registered trademark).

The reproduction device 27 includes a transmitter/receptor 41, a decoder 42, a drawing section 43, a virtual perspective detector 44, and an input section 45.

The transmitter/receptor 41 of the reproduction device 27 receives (acquires) the encoding stream obtained by encoding the 3D model data of each object supplied from the transmission/reception device 25, and supplies the encoding stream to the decoder 42.

The decoder 42 decodes the encoding stream supplied from the transmitter/receptor 41 in a scheme corresponding to the encoding scheme in the encoding device 24. The decoder 42 supplies the 3D model data of one or more object obtained by decoding to the drawing section 43.

The drawing section 43 generates, as a display image, an image of an object (object image) from a perspective of a virtual camera on a basis of the 3D model data of one or more object supplied from the decoder 42, and supplies the object image to the display device 28. The drawing section 43 is supplied with virtual camera viewing range information indicating a viewing range based on the perspective of the virtual camera by the virtual perspective detector 44, and the image of the object from the perspective of the virtual camera is generated by perspective projecting the 3D model(s) of one or more objects supplied from the decoder 42 onto the viewing range of the virtual camera. The viewing range of the virtual camera corresponds to the viewing range at the perspective of the user (viewer), and the virtual camera viewing range information indicating the viewing range based on the perspective of the virtual camera is an example of the viewing information of the user.

Note that in the reproduction device 27, in addition to the 3D model data of each object, the background image is also transmitted in advance from the 3D reconstruction device 23, and the drawing section 43 generates a display image in which the image of each object is superimposed on the background image, and supplies the display image to the display device 28.

The virtual perspective detector 44 detects the perspective of the virtual camera, generates virtual camera viewing range information indicating the viewing range based on the perspective of the virtual camera, and supplies the virtual camera viewing range information to the drawing section 43. For example, the virtual perspective detector 44 detects the viewing position or the viewing range of the user by capturing an image of a marker or the like attached to a head-mounted display serving as the display device 28.

The input section 45 includes an input device such as a controller or a mouse. The input section 45 receives, for example, an instruction of the viewing position from the viewer, a designation of the viewer of an object to be a display target, and the like. The various types of input information received by the input section 45 are supplied to the respective sections in the reproduction device 27 as necessary. The viewing position and the viewing range of the user may be determined on the basis of an instruction of the user received by the input section 45.

The display device 28 includes, for example, a two-dimensional head mounted display (HMD), a two-dimensional monitor, and the like. The display device 28 two-dimensionally displays the display image supplied by the drawing section 43.

The display device 28 may also include a three-dimensional head mounted display, a three-dimensional monitor, and the like. In this case, the drawing section 43 supplies a depth image in addition to the display image to the display device 28, and the display device 28 three-dimensionally displays the display image on the basis of the display image and the depth image supplied by the drawing section 43.

In the image processing system 10 configured as described above, the 3D reconstruction device 23 generates the 3D model for each of the large number of objects present in the shooting space by using the moving image obtained by imaging the shooting space by each of the plurality of imaging devices 21 and stored in the storage device 22. Data of the generated 3D model of the object is transmitted to the reproduction device 27 via the encoding device 24 and the transmission/reception device 25.

When generating the 3D model of the object to be transmitted to the reproduction device 27, the 3D reconstruction device 23 determines a resolution, specifically, a voxel size, of 3D model in accordance with a position of the object in the shooting space, a degree of attention of the user, and the like, and generates the 3D model.

The reproduction device 27 acquires the 3D model data of the object transmitted at the resolution set for each object, generates the object image on the basis of the acquired 3D model data of the object, and displays the object image on the display device 28.

The present invention realizes reduction in the processing load at the reproduction side and reduction in the transmission band while ensuring an image quality of the object image viewed by the viewer, by generating and transmitting the 3D model data in units of object rather than transmitting the 3D model data of the entire shooting space at the distribution side and the reproduction side.

In this specification, only image information is described as transmission data transmitted from the distribution side to the reproduction side, and the description of audio information is omitted, however, the audio information corresponding to the moving image is also transmitted.

In the following, as a data format of the 3D model generated by the 3D reconstruction device 23, among the four data formats described referring to FIG. 2, generation by the multi-texture geometry format will be described.

In addition to determining the voxel size as the resolution of the 3D model, it is necessary in the multi-texture geometry format to determine whether the geometry information of the object is represented by a point cloud or a polygon mesh.

Although the other data formats will be described later, in the point cloud format, since the geometry information of the object is represented by the point cloud, only the voxel size is determined as the resolution of the 3D model. Similarly, in the UV texture geometry format and the multi-texture depth format, since the geometry information of the object is represented by the polygon mesh, only the voxel size is determined as the resolution of 3D model.

3. 3D Reconstruction Device According to First Embodiment

[Block Diagram of 3D Reconstruction Device]

FIG. 4 is a block diagram illustrating a configuration example of a 3D reconstruction device 23 according to a first embodiment.

The 3D reconstruction device 23 includes a foreground/background separator 61, an object tracking section 62, and a 3D model generator 63.

The foreground/background separator 61 acquires background images respectively captured by the plurality of imaging devices 21 from the storage device 22. Further, the foreground/background separator 61 acquires texture images serving as foreground images respectively captured by the plurality of imaging devices 21 from the storage device 22. Although not illustrated in FIG. 4, the foreground/background separator 61 acquires depth images as well as the texture images.

The foreground/background separator 61 generates silhouette images by using the foreground images and the background images respectively captured by the plurality of imaging devices 21, and supplies the silhouette images to the 3D model generator 63. Specifically, as illustrated in the example of FIG. 5, the foreground/background separator 61 generates, as a silhouette image, an image in which the difference between the foreground image and the background image is calculated between the corresponding pixels of the foreground image and the background image. The foreground/background separator 61 generates the plurality of silhouette images respectively corresponding to the foreground images of the plurality of imaging devices 21, and supplies the plurality of silhouette images to the 3D model generator 63.

The object tracking section 62 acquires the texture images serving as the foreground images respectively captured by the plurality of imaging devices 21 and the depth images respectively corresponding the texture images from the storage device 22. The object tracking section 62 also acquires camera parameters of the respective imaging devices 21 from the storage device 22.

The object tracking section 62 uses the camera parameters of the respective imaging devices 21, the texture images serving as the foreground images respectively captured by the imaging devices 21, and the depth images respectively corresponding to the texture images, and detects global position information of each object included in the foreground image. The global position information of each object is defined by, for example, a bounding box surrounding each object in the global coordinate system.

FIG. 6 illustrates a state in which pieces of global position information of three objects in the shooting space 101 are represented by bounding boxes 102-1 to 102-3.

Further, in a case where each object moves in the shooting space, the object tracking section 62 also tracks the movement of the object and detects the global position information of each object after the movement. The global position of the object in the shooting space may be tracked using only image information (including distance information) of the background image, the texture image, and the depth image, or may be tracked using sensor information transmitted from the object by attaching a movement detection sensor, such as a GPS sensor or an acceleration sensor, to an object in the shooting space as necessary. In the present embodiment, any method of recognizing and tracking the global position of the object may be used.

The object tracking section 62 supplies the detected global position information of each object to the 3D model generator 63.

The 3D model generator 63 includes a parameter determination section 81, a 3D data generator 82, and a mesh converter 83. The 3D model generator 63 acquires object spatial information indicating a 3D region of the object in the shooting space for each object, determines the 3D model of the object for each object space, and generates the 3D model data.

The parameter determination section 81 acquires, as information of the object space indicating the 3D region of the object in the shooting space, the global position information of each object from the object tracking section 62. Further, the parameter determination section 81 acquires the camera parameters of the respective imaging devices 21 from the storage device 22.

The parameter determination section 81 determines a parameter of when generating the 3D model data of each object by the multi-texture geometry format on the basis of the acquired global position information of each object and the acquired camera parameters of the respective imaging devices 21.

Specifically, the parameter determination section 81 determines the voxel size of when generating the 3D model of the object and supplies the result to the 3D data generator 82.

The parameter determination section 81 determines whether to represent the geometry information of the object as the point cloud or the polygon mesh, and supplies the result represented by a mesh flag to the 3D data generator 82. In a case where the geometry information of the object is represented by the point cloud, the mesh flag is set to "0", and, in a case where the geometry information of the object is represented by the polygon mesh, the mesh flag is set to "1".

Referring to FIGS. 7 and 8, a method of determining the voxel size of the 3D model of the object will be described.

For example, as illustrated in FIG. 7, the description will be made on a case where there are three objects 111-1 to 111-3 in the shooting space, of which the object 111-3 is the modeling target for generating the 3D model.

The imaging devices 21-1 and 21-2 each images the three objects 111-1 to 111-3.

First, the parameter determination section 81 determines an imaging device 21 from which the distance to the object 111-3, which is the modeling target, is the closest among the plurality of imaging devices 21 that image the object 111-3. Since the camera parameters of the respective imaging devices 21 and the global position information of each object are known, it is possible to determine the imaging device 21 having the closest distance to the object 111-3.

In the example of FIG. 7, when comparing a distance 121-1 from the imaging device 21-1 to the object 111-3 with a distance 121-2 from the imaging device 21-2 to the object 111-3, the distance 121-2 is shorter; therefore, the imaging device 21-2 is determined as the imaging device 21 having the closest distance to the object 111-3. The determined imaging device 21-2 is also referred to as a voxel calculation imaging device.

When the imaging device 21-2 having the closest distance to the object 111-3 is determined, the parameter determination section 81 determines a size corresponding to 1 (one) pixel of the imaging device 21-2 at the position of the object 111-3, as illustrated in FIG. 8, and sets the size as the voxel size. Since the global position information of the object 111-3 and the camera parameter of the imaging device 21-2 are known, it is possible to calculate the size corresponding to one pixel of the imaging device 21-2. For example, when the number of pixels in the horizontal direction (lateral direction) of the shot image of the imaging device 21-2 is 1920 pixels, the F-value of the imaging device 21-2 is 1300, and the distance (distance in the depth direction) from the imaging device 21-2 to the object 111-3 is 15 m, the size corresponding to one pixel is 10 mm. The voxel size of the object 111-3 is thus determined to be 10 mm.

The closer the distance from the object 111-3 serving as the modeling target to the imaging device 21-2 serving as the voxel calculation imaging device is, the smaller the voxel size is set.

Next, a method of determining the mesh flag of the object 111-3 will be described.

The parameter determination section 81 compares the distance from the imaging device 21-2 having the closest distance to the object 111-3 to the object 111-3 with a predetermined threshold, and sets the mesh flag to "1" if the distance is within the predetermined threshold, and sets the mesh flag to "0" if the distance is larger than the predetermined threshold.

That is, the parameter determination section 81 determines to represent the geometry information of the object in the polygon mesh if the distance from the imaging device 21-2 having the closest distance to the object 111-3 to the object 111-3 is within the predetermined threshold, and to represent the geometry information of the distance in the point cloud if the distance is larger than the predetermined threshold.

For example, when the threshold for setting the mesh flag to "1" or "0" is set to "30 m", in the case where the distance from the imaging device 21-2 to the object 111-3 is 15 m, which is an example shown in FIG. 8, the mesh flag is set to "1", and the geometry information of the object is represented by the polygon mesh. When meshing is performed, the amount of data becomes larger than the amount of data in the point cloud, and the processing load becomes heavier, but the image quality is improved.

As described above, the parameter determination section 81 determines a parameter of the 3D model of the object of the modeling target on the basis of the position information of the imaging device 21 that has imaged the object 111-3 of the modeling target and the object 111-3 of the modeling target, and supplies the parameter to the 3D data generator 82.

Returning to FIG. 4, the parameter of the 3D model of each object of the modeling target is supplied from the parameter determination section 81 to the 3D data generator 82, and the global position information of each object, the camera parameter of each imaging device 21, and the foreground image (texture image) captured by each imaging device 21 are also supplied.

The 3D data generator 82 generates the 3D model of each object by using the silhouette images supplied from the foreground/background separator 61, the parameter of the 3D model of the object supplied from the parameter determination section 81, and the like. The data format of the 3D model data of the object generated by the 3D data generator 82 is the multi-texture geometry format in which the geometry information of the object is represented by the point cloud, and the color information of the object is represented by the shot image (two-dimensional texture image) captured by each imaging device 21.

The 3D data generator 82 generates (data of) the 3D model of each object by determining the Visual Hull in the object space supplied from the object tracking section 62 using a plurality of silhouette images of the object of the modeling target. The Visual Hull is an intersection of the plurality of silhouette images obtained in different directions (product set space), and it is possible to generate the 3D model of the object by determining the Visual Hull of the plurality of silhouette images. The object space supplied from the object tracking section 62 is a space defined by the bounding box supplied from the object tracking section 62 with respect to the object of the modeling target.

In a case where the mesh flag of the parameter of the 3D model of the object supplied by the foreground/background separator 61 is "0", the 3D data generator 82 outputs the generated 3D model data of each object in the form of the point cloud. That is, the 3D data generator 82 supplies the generated 3D model data of each object to the encoding device 24 as it is.

On the other hand, in a case where the mesh flag of the parameter of the 3D model of the object supplied by the foreground/background separator 61 is "1", the 3D data generator 82 outputs the generated 3D model data of each object in the form of the mesh. That is, the 3D data generator 82 supplies the generated 3D model data of each object to the mesh converter 83, converts the generated 3D model data of each object into the mesh, and outputs the mesh.

The mesh converter 83 executes a mesh-conversion process that converts the geometry information of the object represented by the point cloud of the 3D model data of each object supplied from the 3D data generator 82 into the polygon mesh. It is to be noted that, as the mesh-conversion process that converts the geometry information in the form of the point cloud into the polygon mesh, for example, a marching cube method or the like may be used, but the mesh-conversion process is not limited thereto, and any method may be employed.

The mesh converter 83 supplies the encoding device 24 with the 3D model data in which the 3D model of each object after being subjected to the mesh-conversion process, that is, the 3D model data in which the geometry information of the object is represented by the polygon mesh and the color information of the object is represented by the foreground image (texture image) captured by each imaging device 21.

[First 3D Reconstruction Process]

FIG. 9 is a flowchart for explaining a 3D reconstruction process (first 3D reconstruction process) according to the first embodiment performed by the 3D reconstruction device 23. The process is started, for example, when a connection is established between the 3D reconstruction device 23 and the reproduction device 27, which is a reproduction-display side, via the network 26.

First, in step S11, the foreground/background separator 61 acquires the background images and the foreground images respectively captured by the plurality of imaging devices 21 from the storage device 22, and generates silhouette images corresponding to the foreground images respectively captured by the plurality of imaging devices 21. The generated plurality of silhouette images is supplied to the 3D data generator 82 of the 3D model generator 63.

In step S12, the object tracking section 62 detects the global position information of each object included in the foreground images respectively captured by the plurality of imaging devices 21, and supplies the global position information to the parameter determination section 81. The global position information of the object is defined, for example, by the bounding box surrounding the object on the global coordinate system.

In step S13, the 3D model generator 63 determines a predetermined object among one or more objects included in the foreground images respectively captured by the plurality of imaging devices 21 as the object of the modeling target for generating the 3D model.

In step S14, the parameter determination section 81 determines the voxel size of the object of the modeling target and supplies the result to the 3D data generator 82. As described with reference to FIGS. 7 and 8, the voxel size is determined by the size corresponding to one pixel when the object of the modeling target is imaged from the voxel calculation imaging device, the voxel calculation imaging device being the imaging device 21 having the closest distance to the object of the modeling target.

In step S15, the parameter determination section 81 determines the mesh flag of the object of the modeling target. That is, the parameter determination section 81 determines whether to represent the geometry information of the object of the modeling target in the polygon mesh or the point cloud. As described above, the mesh flag is set to "1" if the distance from the voxel calculation imaging device to the object of the modeling target is within the predetermined threshold, and is set to "0" if the distance is larger than the predetermined threshold.

In step S16, the 3D data generator 82 generates the 3D model of the object of the modeling target using the silhouette images supplied from the foreground/background separator 61, the parameter of the 3D model of the object supplied from the parameter determination section 81, and the like.

More specifically, the 3D data generator 82 generates the 3D model of the object of the modeling target by determining the Visual Hull using the plurality of silhouette images, with the object space of the modeling target supplied from the object tracking section 62 as a processing target. The data format of the 3D model to be generated here is the multi-texture geometry format in which the geometry information of the object is represented by the point cloud and the color information of the object is represented by the foreground image captured by each imaging device 21.

In step S17, the 3D data generator 82 determines whether the mesh flag supplied from the parameter determination section 81 is "1", in other words, whether the geometry information of the object of the modeling target is represented by the polygon mesh instead of the point cloud.

In a case where it is determined in step S17 that the mesh flag is "1", the process proceeds to step S18, and the 3D data generator 82 supplies the generated 3D model data of the object of the modeling target to the mesh converter 83. The mesh converter 83 executes a mesh-conversion process that converts the geometry information of the object of the modeling target represented by the point cloud into the polygon mesh, for example, by using a marching cube method or the like.

In step S19, the mesh converter 83 outputs, to the encoding device 24, the 3D model data of the object of the modeling target in which the geometry information of the object is represented by the polygon mesh and the color information of the object is represented by the foreground image captured by each imaging device 21.

On the other hand, in a case where it is determined in step S17 that the mesh flag is "0", the process proceeds to step S20, and the 3D data generator 82 outputs the generated 3D model data of the object of the modeling target to the encoding device 24. In this case, the 3D model data in which the geometry information of the object is represented by the point cloud and the color information of the object is represented by the foreground image captured by each imaging device 21 is supplied to the encoding device 24.

In step S21, the 3D model generator 63 determines whether all the objects included in the foreground image captured by each imaging device 21 has been determined to be the object of the modeling target.

In a case where it is determined in step S21 that all the objects have not been determined to be the object of the modeling target, the process is returned to step S13, and the processes of steps S13 to S21 described above are repeated. That is, an object that has not been determined to be a modeling target is determined to be the modeling target, the parameter of the 3D model is determined, and (the 3D model data of) the 3D model is generated according to the determined parameter and is supplied to the encoding device 24.

On the other hand, in a case where it is determined in step S21 that all the object have been determined to be object the modeling target, the 3D reconstruction process ends.

According to the above-mentioned first 3D reconstruction process, the 3D region of each object is generated by acquiring object spatial information indicating the 3D region of the object in the shooting space for each object, and determining the Visual Hull using the plurality of silhouette images, with the object space of the modeling target as the processing target. At this time, the parameter of the 3D model, specifically, the mesh flag and the voxel size are determined for each object on the basis of the position information of the imaging device 21 that has imaged the object of the modeling target and the object.

The generation of the 3D model in which the target of generating the 3D model is, instead of the entire shooting space, limited to the object space of the object, makes it possible to reduce the processing load and perform the modeling at high speed. Further, it is possible to reduce the transmission band at the time of transmission to the reproduction device 27.

Further, since the parameter of the 3D model is determined for each object of the modeling target, it is possible to adjust the image quality and the load for each object.

4. Modification Example of First Embodiment

[Block Diagram of 3D Reconstruction Device]

FIG. 10 is a block diagram illustrating a modification example of a 3D reconstruction device 23 according to the first embodiment.

In the above-described first embodiment, the 3D reconstruction device 23 itself generates the silhouette images by using the foreground images and the background images respectively captured by the plurality of imaging devices 21.

However, the silhouette images generated by other devices (e.g., the imaging devices 21) may be supplied to the 3D reconstruction device 23, and the 3D reconstruction device 23 may generate a 3D model of each object using the supplied silhouette images.

The 3D reconstruction device 23 of FIG. 10 is a block diagram indicating a configuration example in a case where the silhouette images generated by other devices are supplied to the 3D reconstruction device 23.

In FIG. 10, the sections corresponding to the configuration in FIG. 4 according to the first embodiment are denoted by the same reference numerals, and descriptions thereof are omitted.

In the 3D reconstruction device 23 of FIG. 10, the silhouette images generated by other devices are supplied, so that the foreground/background separator 61 is omitted. For example, the silhouette images generated by other devices are temporarily stored in the storage device 22, and are supplied from the storage device 22 to the 3D reconstruction device 23. The silhouette images supplied to the 3D reconstruction device 23 are supplied to the 3D data generator 82. The rest of the configuration is the same as that of the first embodiment described above.

5. 3D Reconstruction Device According to Second Embodiment

[Block Diagram of 3D Reconstruction Device]

FIG. 11 is a block diagram illustrating a configuration example of a 3D reconstruction device 23 according to a second embodiment.

Also in FIG. 11 illustrating the configuration example of the second embodiment, the sections corresponding to the configuration in FIG. 4 illustrating the configuration example of the first embodiment are denoted by the same reference numerals, and descriptions of the sections are omitted as appropriate, and sections differing from those in FIG. 4 are described.

The second embodiment differs from the first embodiment described above in that, as viewing information of the user, the virtual camera viewing range information indicating the viewing range based on the perspective of the virtual camera is supplied from the reproduction device 27 to the 3D reconstruction device 23 via the transmission/reception device 25. The virtual camera viewing range information includes, for example, the external parameter and the inner parameter of the virtual camera, near information representing a front clip surface of a view frustum, and far information representing a rear clip surface of the view frustum.

The 3D reconstruction device 23 according to the first embodiment generates a 3D model for every object in the shooting space.

In contrast, the 3D reconstruction device 23 according to the second embodiment generates a 3D model only for the object in the viewing range of the virtual camera on the basis of the virtual camera viewing range information from the reproduction device 27.

The 3D model generator 63 determines the 3D model of the object for each object space only for the object included in the viewing range of the user, and generates the 3D model data.

The virtual camera viewing range information transmitted from the reproduction device 27 is supplied to the parameter determination section 81 included in the 3D model generator 63.

The parameter determination section 81 selects (determines) the object included in the viewing range of the virtual camera among all the objects included in the shooting space on the basis of the virtual camera viewing range information and the global position information of each object supplied from the object tracking section 62.

As illustrated in FIG. 12, the parameter determination section 81 determines whether or not the object is included in the viewing range of the virtual camera 141, specifically, whether or not the object is included in the viewing frustum 142 indicated by hatching, for all the objects included in the shooting space.

More specifically, the parameter determination section 81 projects pieces of vertex information that configure the bounding box of the object onto an image surface 143 of the virtual camera 141, and, in a case where at least one set of the UV coordinates corresponding to a piece of vertex information is included in the image surface 143 of the virtual camera 141, the parameter determination section 81 determines to be within the viewing range of the virtual camera 141. On the other hand, in a case where all of the UV coordinates corresponding to the pieces of vertex information that configure the bounding box are not included in the image surface 143 of the virtual camera 141, the parameter determination section 81 determines that the object is out of the viewing range of the virtual camera 141.

In the example of FIG. 12, since a projection plane 153-1 on which a bounding box 152-1 of an object 151-1 is projected is included in the image surface 143 of the virtual camera 141, it is determined that the object 151-1 is within the viewing range of the virtual camera 141. On the other hand, since a projection plane 153-2 on which a bounding box 152-2 of an object 151-2 is projected is not included in the image surface 143 of the virtual camera 141, it is determined that the object 151-2 is out of the viewing range of the virtual camera 141. The image surface 143 of the virtual camera 141 is represented in a UV-coordinate system.

Further, as illustrated in FIG. 13, even within the viewing range of the virtual camera 141, the 3D model is not generated for the object that is the occlusion of another object.

In the example of FIG. 13, since the projection plane on which a bounding box 162-2 of an object 161-2 is projected is completely included in a projection plane 163-1 on which a bounding box 162-1 of an object 161-1 is projected, the object 161-2 is the occlusion of the object 161-1. The object 161-2 is therefore excluded from the modeling target of the 3D model.

The process performed by the 3D model generator 63 after the object included in the viewing range of the virtual camera 141 is selected is basically similar to that of the first embodiment.

However, in the first embodiment, the voxel size is determined by the size corresponding to one pixel when the object of the modeling target is imaged from the voxel calculation imaging device, with the imaging device 21 having the closest distance to the object of the modeling target as the voxel calculation imaging device.

In second embodiment, in contrast, the voxel calculation imaging device is replaced with virtual camera 141.

That is, the imaging device 21-2 serving as the voxel calculation imaging device described referring to FIG. 7 and FIG. 8 is replaced with virtual camera 141, and the voxel size is determined by the size corresponding to one pixel when the object of the modeling target is imaged from the virtual camera 141. The closer the distance from the virtual camera 141 to the object of the modeling target is, the smaller the voxel size is set. The distance from the virtual camera 141 to the object of the modeling target corresponds to the degree of attention of the user.

Further, in a case where the distance from the virtual camera 141 to the object of the modeling target is within the predetermined threshold, the geometry information of the object is represented by the polygon mesh, and in a case where the distance is larger than predetermined threshold, the geometry information of the object is represented by the point cloud.

As described above, the parameter determination section 81 determines the parameter of the 3D model of the object of the modeling target on the basis of the virtual camera viewing range information supplied as the viewing information of the user and the position information of the object of the modeling target, and supplies the parameter to the 3D data generator 82. The 3D data generator 82 generates the 3D model data of the object of the modeling target.

[Second 3D Reconstruction Process]

FIG. 14 is a flowchart for explaining a 3D reconstruction process (second 3D reconstruction process) performed by the 3D reconstruction device 23 according to the second embodiment. The process is initiated, for example, when a connection is established between the 3D reconstruction device 23 and the reproduction device 27, which is the reproduction-display side, via the network 26.

Comparing the steps of the second 3D reconstruction process of FIG. 14 with the steps of the first 3D reconstruction process described with reference to FIG. 9, step S43 and step S44 are newly added, and the other steps S41, S42, S45 to S53 are similar to steps S11 to S21 of FIG. 9.

Specifically, first, in steps S41 and S42, the foreground/background separator 61 generates the silhouette images, and the object tracking section 62 detects the global position information of each object in the similar manner as in steps S11 and S12 of FIG. 9, respectively.

In step S43, the parameter determination section 81 acquires the virtual camera viewing range information transmitted from the reproduction device 27.

Thereafter, in step S44, the parameter determination section 81 determines, as the object of which the 3D model is to be generated, an object included in the viewing range of the virtual camera from among all the objects included in the shooting space, on the basis of the virtual camera viewing range information and the global position information of each object that is supplied from the object tracking section 62. Note that even if the object is included in the viewing range of the virtual camera, the object that is the occlusion of another object is excluded from the object of which the 3D model is to be generated.

The subsequent steps S45 to S53 are the same as steps S13 to S21 of FIG. 9, respectively.

However, in the first 3D reconstruction process of FIG. 9, the 3D model generator 63 sets all objects included in shooting space (foreground image) as the objects of the modeling target for generating the 3D model, and repeatedly executes steps S13 to S21 for each object of the modeling target.

In contrast, in the second 3D reconstruction process of FIG. 14, the 3D model generator 63 sets one or more objects each selected as the object of which the 3D model is to be generated in step S44 as the objects of the modeling targets for generating the 3D models, and repeatedly executes steps S45 to S53 for each object of the modeling target.

According to the second 3D reconstruction process, the 3D model is generated only for the object in the viewing range of the virtual camera. As for the generation of the 3D model, similarly to the first embodiment, the object spatial information is acquired for each object, and the 3D model of each object is generated using the object space of the modeling target as the processing target.

In generating the 3D model, by limiting the target of generating the 3D model to the object space of the object and by limiting the target of generating the 3D model to the viewing range of the user, it is possible to reduce the processing load and to perform the modeling at high speed. Further, it is possible to reduce the transmission band at the time of transmission to the reproduction device 27.

Since the parameter of the 3D model is determined for each object of the modeling target, it is possible to adjust the image quality and the load for each object.

Also in the second embodiment, as in the modification example of the first embodiment, a configuration may be employed in which the silhouette images generated by other devices are acquired and the 3D model of each object is generated.

6. 3D Reconstruction Device According to Third Embodiment

[Block Diagram of 3D Reconstruction Device]

FIG. 15 is a block diagram illustrating a configuration example of a 3D reconstruction device 23 according to a third embodiment.

Also in FIG. 15 illustrating the configuration example of the third embodiment, the sections corresponding to the configuration in FIG. 4 illustrating the configuration example of the first embodiment are denoted by the same reference numerals, and descriptions of the sections are omitted as appropriate, and sections differing from those in FIG. 4 are described.

The third embodiment differs from the first embodiment described above in that, as the viewing information of the user, the virtual camera viewing range information indicating the viewing range based on the perspective of the virtual camera and object identification information indicating an object designated as a display target by the user are supplied from the reproduction device 27 to the 3D reconstruction device 23 via the transmission/reception device 25. In the present embodiment, the object identification information is referred to as an object ID. The virtual camera viewing range information is similar to the second embodiment.

The 3D reconstruction device 23 according to the first embodiment generates a 3D model for every object in the shooting space.

In contrast, the 3D reconstruction device 23 according to the third embodiment generates a 3D model only for the object designated by the user as the display target.

Therefore, as illustrated in A of FIG. 16, the 3D model generator 63 first adds object ID's to the pieces of global position information of all objects and transmits the object ID's and the pieces of global position information to the reproduction device 27.

There may be employed as the pieces of global position information of the respective objects, for example, as illustrated in B of FIG. 16, a minimum value xmin and a maximum value xmax of the x coordinate of a bounding box, a minimum value ymin and a maximum value ymax of the y coordinate of the bounding box, and a minimum value zmin and a maximum value zmax of the z coordinate of the bounding box.

The object ID (ID's) of one or more objects designated by the user is transmitted from the reproduction device 27 to the 3D model generator 63 together with the virtual camera viewing range information as the viewing information of the user.

The 3D model generator 63 determines the 3D model of the object for each object space only for the object designated by the user as the display target on the basis of the virtual camera viewing range information and the object ID from the reproduction device 27, and generates the 3D model data.

The virtual camera viewing range information and the object ID from the reproduction device 27 are supplied to the parameter determination section 81 included in the 3D model generator 63.

The parameter determination section 81 determines (selects) an object of which the 3D model data is to be generated on the basis of the object ID from the reproduction device 27.

The process performed by the 3D model generator 63 after the object of which the 3D model data is to be generated is determined is similar to the process of second embodiment. That is, on the basis of the virtual camera viewing range information, the voxel size is determined by the size corresponding to the size of one pixel when the object of the modeling target is imaged from the virtual camera 141. Whether the geometry information of the object of the modeling target is represented by the polygon mesh or the point cloud is determined on the basis of whether the distance from the virtual camera 141 to the object of the modeling target is within a predetermined threshold determined in advance.

[Third 3D Reconstruction Process]

FIG. 17 is a flowchart for explaining a 3D reconstruction process (third 3D reconstruction process) performed by the 3D reconstruction device 23 according to the third embodiment. This process is initiated, for example, when a connection is established between the 3D reconstruction device 23 and the reproduction device 27, which is the reproduction-display side, via the network 26.

Comparing the steps of the third 3D reconstruction process of FIG. 17 with the steps of the first 3D reconstruction process described with reference to FIG. 9, steps S73 to S75 are newly added, and the other steps S71, S72, S76 to S84 are similar to steps S11 to S21 of FIG. 9.

Specifically, first, in steps S71 and S72, the foreground/background separator 61 generates the silhouette images, and the object tracking section 62 detects the global position information of each object in the similar manner as in steps S11 and S12 of FIG. 9, respectively.

In the step S73, the parameter determination section 81 transmits object ID's and pieces of global position information of all objects in the shooting space to the reproduction device 27 via the transmission/reception device 25 or the like.

In the step S74, the parameter determination section 81 acquires the object ID (ID's) and the (pieces of) virtual camera viewing range information of one or more objects specified by the user, which are transmitted from the reproduction device 27 as the viewing information of the user.

In the step S75, the parameter determination section 81 determines the object specified by the user as the object of which the 3D model is to be generated on the basis of the object ID from the reproduction device 27.

The subsequent steps S76 to S84 are the same as steps S13 to S21 of FIG. 9, respectively.

However, in the first 3D reconstruction process of FIG. 9, the 3D model generator 63 sets all objects included in shooting space (foreground image) as the objects of the modeling target for generating the 3D model, and repeatedly executes steps S13 to S21 for each object of the modeling target.

In contrast, in the third 3D reconstruction process of FIG. 17, the 3D model generator 63 sets one or more objects each determined as the object of which the 3D model is to be generated in step S75 as the objects of the modeling targets for generating the 3D models, and repeatedly executes steps S76 to S84 for each object of the modeling target.

According to the third 3D reconstruction process, the 3D model is generated only for the object designated by the user as the viewing information of the user. As for the generation of the 3D model, similarly to the first embodiment, the object spatial information is acquired for each object, and the 3D model of each object is generated using the object space of the modeling target as the processing target.

In generating the 3D model, by limiting the target of generating the 3D model to the object space of the object and by limiting the target of generating the 3D model to the object specified by the user, it is possible to reduce the processing load and to perform the modeling at high speed. Further, it is possible to reduce the transmission band at the time of transmission to the reproduction device 27.

Since the parameter of the 3D model is determined for each object of the modeling target, it is possible to adjust the image quality and the load for each object.

Also in the third embodiment, as in the modification example of the first embodiment, a configuration may be employed in which the silhouette images generated by other devices are acquired and the 3D model of each object is generated.

7. Summary of First to Third Embodiments

FIG. 18 is a table summarizing the modeling method of the 3D model of the 3D reconstruction device 23 according to the first to third embodiments.

In first embodiment, all objects present in the imaging space are each determined to be the object of the modeling target.

Thereafter, the voxel size and the presence or absence of meshing are determined on the basis of a position relationship between the imaging device 21 having the closest distance to the object of the modeling target and the object. Specifically, for the voxel size, an object close to the imaging device 21 is set finely and an object far from the imaging device 21 is set coarsely. Regarding the presence or absence of meshing, an object close to the imaging device 21 is meshed, and an object far from the is imaging device 21 is not meshed and is represented by the point cloud.

As described above, by determining the modeling method of the 3D model for each object of the modeling target, it is possible to adjust the image quality and the load for each object.

Further, in modeling the object, since the object spatial information indicating the 3D region of the object is acquired for each object and the 3D model of the object is generated with the object space of the modeling target as the processing target, it is possible to reduce the processing load and to perform the modeling at high speed. Moreover, it is possible to reduce the transmission band at the time of transmission to the reproduction device 27.

In the second embodiment, in order to determine the object of the modeling target, the virtual camera viewing range information is supplied from the reproduction device 27, and the object included in the viewing range of the virtual camera 141 is determined as the object of the modeling target on the basis of the virtual camera viewing range information.

Thereafter, the voxel size and the presence or absence of meshing are determined on the basis of a position relationship between the virtual camera 141 and the object of the modeling target. Specifically, for the voxel size, an object close to the virtual camera 141 is set finely and an object far from the virtual camera 141 is set coarsely. Regarding the presence or absence of meshing, an object close to the virtual camera 141 is meshed, and an object far from the is virtual camera 141 is not meshed and is represented by the point cloud.

As described above, by determining the modeling method of the 3D model for each object of the modeling target, it is possible to adjust the image quality and the load for each object.

Further, in modeling the object, since the object spatial information indicating the 3D region of the object is acquired for each object and the 3D model of the object is generated with the object space of the modeling target as the processing target, it is possible to reduce the processing load and to perform the modeling at high speed. Moreover, it is possible to reduce the transmission band at the time of transmission to the reproduction device 27.

In addition, since the 3D model(s) of only the object(s) in the viewing range of the virtual camera is(are) generated, it is possible to reduce the processing load and to increase the process speed as compared with the case of modeling all the objects in the shooting space.

In the third embodiment, in order to determine the object of the modeling target, the object ID designated as a display target by the user and the camera viewing range information are supplied from the reproduction device 27, and the object corresponding to the object ID designated by the user is determined as the object of the modeling target.

Thereafter, the voxel size and the presence or absence of meshing are determined on the basis of a position relationship between the virtual camera 141 and the object of the modeling target. Specifically, for the voxel size, an object close to the virtual camera 141 is set finely and an object far from the virtual camera 141 is set coarsely. Regarding the presence or absence of meshing, an object close to the virtual camera 141 is meshed, and an object far from the is virtual camera 141 is not meshed and is represented by the point cloud.

As described above, by determining the modeling method of the 3D model for each object of the modeling target, it is possible to adjust the image quality and the load for each object.

Further, in modeling the object, since the object spatial information indicating the 3D region of the object is acquired for each object and the 3D model of the object is generated with the object space of the modeling target as the processing target, it is possible to reduce the processing load and to perform the modeling at high speed. Moreover, it is possible to reduce the transmission band at the time of transmission to the reproduction device 27.

In addition, since the 3D model(s) of only the object(s) designated as the display target by the user is(/are) generated, it is possible to reduce the processing load and to increase the process speed as compared with the case of modeling all the objects in the shooting space.

8. Another Configuration Examples of Image Processing System

FIG. 19 is a block diagram illustrating another configuration example of an image processing system to which the present technology is applied.

In FIG. 19, the sections corresponding to those in FIG. 3 are denoted by the same reference numerals, and descriptions of the sections are omitted. The description will be given by focusing on the different sections.

Comparing the image processing system 10 of FIG. 19 with the image processing system 10 of FIG. 3, a selection device 30 is newly added between the storage device 22 and the 3D reconstruction device 23. The rest of the configuration of the image processing system 10 of FIG. 19 is the same as the image processing system 10 of FIG. 3. It is to be noted that the selection device 30 may be added as a part of the 3D reconstruction device 23.

To the selection device 30, the virtual camera viewing range information serving as the viewing information of the user is supplied from the reproduction device 27 via the transmission/reception device 25, in the similar manner as the 3D reconstruction device 23.

The selection device 30 has a function of detecting the global position information of each object included in the foreground image captured by each imaging device 21, in the similar manner as the above-mentioned object tracking section 62.

In the image processing system 10 of FIG. 3, the 3D reconstruction device 23 acquires the foreground images and the depth images respectively captured by all the imaging devices 21 (imaging devices 21-1 to 21-N).

In contrast, in the image processing system 10 of FIG. 19, the selection device 30 specifies the object included in the viewing range of the virtual camera on the basis of the virtual camera viewing range information transmitted from the reproduction device 27. Then, the selection device 30 selects a foreground image and a depth image including the specified object from among the foreground images (texture images) and the depth images respectively captured by all the imaging devices 21 and stored in the storage device 22, acquires the foreground image and the depth image from the storage device 22, and supplies the foreground image and the depth image to the 3D reconstruction device 23.

For example, as illustrated in FIG. 20, three objects 181-1 to 181-3 included in the viewing range of the virtual camera 141 are specified on the basis of the virtual camera viewing range information. The three objects 181-1 to 181-3 are assumed to be included in the foreground image captured by the imaging devices 21-1 and 21-2, but not included in the foreground image captured by the imaging device 21-3.

In this case, the selection device 30 supplies the foreground images captured by the imaging devices 21-1 and 21-2 to the 3D reconstruction device 23, and does not supply the foreground image captured by the imaging device 21-3 to the 3D reconstruction device 23.

FIG. 21 is a diagram illustrating a process of selecting foreground images in which the object included in the viewing range is included, from among the foreground images respectively captured by seven imaging devices 21, the imaging devices 21-1 to 21-7.

FIG. 21 illustrates an example in which, of the foreground images respectively captured by the imaging devices 21-1 to 21-7, which are stored in the storage device 22, the objects included in the viewing range of the virtual camera 141 do not appear in the foreground image captured by the imaging device 21-3 and the foreground image captured by the imaging device 21-6.

In this case, the selection device 30 selects the foreground images captured by the imaging devices 21-1, 21-2, 21-4, 21-5, and 21-6 and supplies the foreground images to the 3D reconstruction device 23, and does not supply the foreground images captured by the imaging devices 21-3 and 21-6 as unselected to the 3D reconstruction device 23. The 3D reconstruction device 23 uses the foreground images supplied from the selection device 30 to determine and generate the 3D model of the object.

It is to be noted that, in a case where the silhouette images generated by other devices are stored in the storage device 22 as in the modification examples of the first to third embodiments described above, the silhouette image corresponding to the foreground image including the object included in the viewing range of the virtual camera 141 is selected and supplied to the 3D reconstruction device 23.

In this manner, in the image processing system 10, by adding the selection device 30 for selecting the foreground image or the silhouette image to be supplied to the 3D reconstruction device 23 that generates the 3D model, it is possible to reduce the processing load of the 3D reconstruction device 23 and to increase the process speed of the 3D reconstruction device 23.

9. Distribution Process and Reproduction Process

Next, a distribution process, which is the process of the entire distribution side of the image processing system 10, and a reproduction process, which is the process of the entire reproduction side of the image processing system 10, will be described.

[Distribution Process]

First, referring to a flowchart of FIG. 22, the distribution process performed by the distribution side of the image processing system 10 will be described.

First, in step S301, each of the plurality of imaging devices 21 captures a predetermined shooting space and supplies the resulting moving image to the storage device 22.

In step S302, the 3D reconstruction device 23 determines a parameter for each object by using the moving image obtained by each of the plurality of imaging devices 21, which is stored in the storage device 22, and generates the 3D model. The generated 3D model data of each object is supplied to the encoding device 24.

In step S302, as described above, in the first embodiment, all the objects present in the imaging space are determined to be the modeling targets, and the 3D models are generated. In second embodiment, the object in the viewing range of the user (the viewing range of the virtual camera) is determined to be the modeling target, and the 3D model is generated. In the third embodiment, the object designated by the user is determined to be the modeling target, and the 3D model is generated.

Further, in a case where the selection device 30 is provided as in the image processing system 10 illustrated in FIG. 19, a process of selecting a foreground image or a silhouette image on the basis of the virtual camera viewing range information is added between step S301 and step S302.

In step S303, the encoding device 24 encodes the 3D model data of each object supplied from the 3D reconstruction device 23 by a predetermined encoding scheme such as, for example, an AVC scheme, an HEVC scheme, or the like. The encoding stream of the 3D model obtained by encoding is supplied to the transmission/reception device 25.

In the step S304, the transmission/reception device 25 transmits the encoding stream of the 3D model supplied from the encoding device 24 to the reproduction device 27 via the network 26.

According to the above distribution process, it is possible to select any 3D model from among a large number of 3D models of the objects generated by being imaged by the plurality of imaging devices 21, and to transmit the 3D model data so as to be reproduced by the reproduction device 27.

[Reproduction Process]

Next, referring to a flowchart of FIG. 23, the reproduction process performed by the reproduction side of the image processing system 10 will be described.

First, in step S321, the transmitter/receptor 41 of the reproduction device 27 receives (acquires) the encoding stream obtained by encoding the 3D model data of each object, which is supplied from the transmission/reception device 25, and supplies the encoding stream to the decoder 42.

In step S322, the decoder 42 decodes the encoding stream of the 3D model supplied from the transmitter/receptor 41 in a scheme corresponding to the encoding scheme in the encoding device 24. The decoder 42 supplies the 3D model data of each object obtained by decoding to the drawing section 43.

In step S323, the drawing section 43 generates an image of the object (object image) from the perspective of the virtual camera as a display image on the basis of the 3D model data of each object supplied from the decoder 42, and supplies the object image to the display device 28.

In step S324, the display device 28 displays two-dimensionally the display image supplied from the drawing section 43, and ends the reproduction process.

According to the above reproduction process, it is possible to receive (data of) the 3D model generated by determining the parameter of the 3D model for each object and to cause the display device 28 to display the 3D model.

According to the image processing system 10, it is possible to adjust the image quality and the load for each object by determining the modeling method of the 3D model for each object of the modeling target.

Further, since the 3D model of the object is generated by acquiring the object spatial information indicating the 3D region of the object for each object and using the object space of the modeling target as the processing target, it is possible to reduce the processing load and to reduce the transmission band at the time of transmission to the reproduction device 27.

In addition, in a case where the object of the modeling target is limited on the basis of the viewing information of the user, it is possible to reduce the processing load and to increase the process speed as compared with the case of modeling all the objects in the shooting space.

10. Case of Performing Transmission in Data Format Other Than Multi-Texture Geometry Format In the examples described above, as the data format of the 3D model, the case where the data is generated by the multi-texture geometry format among the four data formats described referring to FIG. 2 has been described.

In a case where the transmission is performed by the point cloud format as the data format of 3D model, since the geometry information of the object is represented by the point cloud, the determination as to whether or not meshing is to be performed is omitted. The 3D model generator 63 of the 3D reconstruction device 23 determines the voxel size in accordance with the distance from the imaging device 21 or the virtual camera 141 to the object of the modeling target, and generates the 3D model.

In a case where the transmission is performed by the UV texture geometry format as the data format of 3D model, since the geometry information of the object is represented by the polygon mesh, the determination as to whether or not meshing is to be performed is omitted. The 3D model generator 63 of the 3D reconstruction device 23 determines the voxel size in accordance with the distance from the imaging device 21 or the virtual camera 141 to the object of the modeling target, and generates the 3D model.

In a case where the transmission is performed by the multi-texture depth format as the data format of 3D model, the determination as to whether or not meshing is to be performed is omitted, and first, the geometry information of the object is represented by the polygon mesh. The 3D model generator 63 of the 3D reconstruction device 23 determines the voxel size in accordance with the distance from the imaging device 21 or the virtual camera 141 to the object of the modeling target, and generates the 3D model representing the geometry information of the object by the polygon mesh of the determined voxel size. Thereafter, the 3D model generator 63 generates a plurality of depth images corresponding to the plurality of shot images (texture images) obtained by the plurality of imaging devices 21 on the basis of the geometry information of the object represented by the polygon mesh, and transmits the 3D model data of the multi-texture depth format.

11. Case of Performing Transmission to Multiple Users

In the examples described above, a case has been described of the 3D reconstruction device 23, which is the distribution side, and the reproduction device 27 and the display device 28, which are the reproduction side, have a one-to-one relation. However, there may be a configuration in which a plurality of users is present as the reproduction side, and the 3D reconstruction device 23, which is a distribution side, transmits the 3D model of the predetermined object in response to requests from a plurality of reproduction devices 27 corresponding to the plurality of users.

In this case, the 3D reconstruction device 23 may individually determine and transmit the 3D model of the object in accordance with the pieces of viewing information (the viewing ranges of the virtual cameras) of the respective users of the plurality of reproduction devices 27, or may, for example, calculate the viewing ranges of the plurality of users and the OR of the designated object to determine and transmit the 3D models of the plurality of objects corresponding to the calculation result.

12. Computer Configuration Example

A series of processes including the 3D reconstruction process, the distribution process, the reproduction process, and the like described above may be executed by hardware or software. In a case where the series of processes is executed by software, a program that configures the software is installed in a computer. Here, the computer includes a computer incorporated in dedicated hardware, or, for example, a general-purpose personal computer capable of executing various functions by installing various programs, etc.

FIG. 24 is a block diagram illustrating a configuration example of hardware of a computer that executes the series of processes described above by programs.

In the computer 900, a CPU (Central Processing Unit) 901, a ROM (Read Only Memory) 902, and a RAM (Random Access Memory) 903 are coupled to each other via a bus 904.

An input/output interface 905 is also coupled to the bus 904. An input section 906, an output section 907, a storage 908, a communication section 909, and a drive 910 are connected to the input/output interface 905.

The input section 906 includes a keyboard, a mouse, a microphone, and the like. The output section 907 includes a display, a speaker, and the like. The storage 908 includes a hard disk, a nonvolatile memory, and the like. The communication section 909 includes a network interface, and the like. The drive 910 drives a removable medium 911 such as a magnetic disk, an optical disc, a magneto-optical disk, a semi-conductor memory, or the like.

In the computer 900 configured as described above, for example, the CPU 901 loads a program stored in the storage 908 into the RAM 903 via the input/output interface 905 and the bus 904 and executes the program, thereby performing the series of processes described above.

It is possible to provide the program to be executed by the computer 900 (CPU 901) by being recorded in the removable medium 911 as a package medium or the like, for example. In addition, it is possible to provide program via a wired or wireless transmission medium such as a local area network, the Internet, or digital satellite broadcasting.

In the computer 900, a program can be installed in the storage 908 via the input/output interface 905 by attaching the removable medium 911 to the drive 910. It is also possible to receive the program by the communication section 909 and to install the program in the storage 908 via wired or wireless transmission media. In addition, it is possible to install the program in the ROM 902 or storage 908 in advance.

The program executed by the computer 900 may be a program that performs processes in time series in the order described in this specification, or may be a program that performs processes in parallel or at required timings such as when a call is made.

13. Application Example

The techniques according to an embodiment of the present disclosure may be applied to various products. For example, the techniques according to an embodiment of the present disclosure may be implemented as a device mounted on any type of moving object such as a vehicle, an electric vehicle, a hybrid electric vehicle, a motorcycle, a bicycle, a personal mobility, an airplane, a drone, a vessel, a robot, a construction machine, an agricultural machine (tractor), or the like.

FIG. 25 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 25, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 25 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 26 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 26 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 25, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform perspective conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 25, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 25 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It is possible to implement a computer program for achieving the functions of the above-described image processing system 10 in any of the control units or the like. It is also possible to provide a computer-readable recording medium in which such a computer program is stored. The recording medium includes, for example, a magnetic disk, an optical disc, a magneto-optical disk, a flash memory, and the like. In addition, the computer program described above may be distributed, for example, through a network without using a recording medium.

In a case where the image processing system 10 described above is applied to the above-mentioned vehicle control system 7000, for example, the imaging device 21 of the image processing system 10 corresponds to at least a part of the imaging section 7410. Further, the storage device 22, 3D reconstruction device 23, the encoding device 24, the transmission/reception device 25, and the reproduction device 27 are integrated and correspond to the microcomputer 7610 and the storage 7690. The display device 28 corresponds to the display section 7720. The network 26 between the transmission/reception device 25 and the reproduction device 27 may be omitted. In a case where the viewing range of the driver serving as the user is detected, the detection is performed by a part of the imaging section 7410 or the driver state detecting section 7510.

As described above, by applying the image processing system 10 to the integrated control unit 7600 of the application example illustrated in FIG. 25, for example, when updating the 3D map information or the like while acquiring the surrounding environment by the Lidar while driving the vehicle, it is possible to determine the presence or absence of meshing or the voxel size in accordance with a degree of importance of the recognized object, and to display the generated 3D map information as the display image on the display section 7720 or the like with high image quality (high resolution).

Further, at least some of the components of the image processing system 10 may be implemented in a module for the integrated control unit 7600 illustrated in FIG. 25 (e.g., an integrated-circuit module including a single die). Alternatively, the image processing system 10 may be implemented by a plurality of control units of the vehicle control system 7000 illustrated in FIG. 25.

In this specification, the system means a collection of a plurality of components (devices, modules (parts), and the like), and whether or not all the components are in the same housing is not limited. Thus, a plurality of devices housed in separate housings and connected via a network, and a plurality of modules housed in a housing, are all systems.

Note that the effects described in this specification are merely illustrative and not limiting, and other effects may be provided.

The embodiments of the present disclosure are not limited to the embodiments described above, and various modifications can be made without departing from the gist of the present disclosure.

For example, the present disclosure may have a cloud computing configuration in which one function is shared and processed jointly by a plurality of devices via a network.

In addition, it is possible execute the steps in the flowchart described above by one device, and it is also possible to share the steps between a plurality of devices for execution.

Further, in a case where a plurality of processes is included in one step, it is possible to execute the plurality of processes included in the one step with one device and it is also possible to share the plurality of processes between the plurality of devices for execution.

It is to be noted that the present disclosure may have the following configurations.

(1)

An image processing device including a 3D model generator that acquires object spatial information indicating a 3D region of an object for each object, and generates a 3D model of an object for each object space.

(2)

The image processing device according to (1), in which the 3D model generator determines a parameter of the 3D model of the object on a basis of position information of an imaging device that has imaged the object and the object.

(3)

The image processing device according to (2), in which the 3D model generator determines the parameter on a basis of position information of an imaging device and the object, the imaging device being nearest to the object of which the 3D model is to be generated out of a plurality of imaging devices that has imaged the object.

(4)

The image processing device according to any one of (1) to (3), in which the 3D model of the object represents color information of the object by a plurality of texture images that is captured from a plurality of directions, and represents geometry information of the object by a point cloud or a polygon mesh.

(5)

The image processing device according to (4), in which the 3D model generator represents the geometry information of the object by the polygon mesh in a case where a distance from an imaging device to the object is within a predetermined threshold, and represents the geometry information of the object by the point cloud in a case where the distance is larger than the predetermined threshold.

(6)

The image processing device according to (2), in which the 3D model generator sets a smaller voxel size with a decrease in a distance from the imaging device to the object.

(7)

The image processing device according to (1), in which the 3D model generator determines a parameter of the 3D model of the object on a basis of viewing information of a user and position information of the object.

(8)

The image processing device according to (7), in which the viewing information of the user is viewing range information indicating a viewing range of a user based on a perspective of a virtual camera, and the 3D model generator generates the 3D model of the object that is included in the viewing range of the user.

(9) The image processing device according to (8), in which the 3D model of the object represents color information of the object by a plurality of texture images that is captured from a plurality of directions, and represents geometry information of the object by a point cloud or a polygon mesh, and the 3D model generator represents, with regard to an object whose degree of attention of the user is low, the geometry information of the object by the point cloud.

(10) The image processing device according to (8) or (9), in which the 3D model generator sets a smaller voxel size to an object whose degree of attention of the user is higher.

(11) The image processing device according to (9) or (10), in which the 3D model generator uses, as the degree of attention of the user, a distance from the virtual camera to the object.

(12) The image processing device according to (7), in which the viewing information of the user is object identification information indicating an object designated as a display target by the user, and the 3D model generator generates the 3D model of the object indicated by the object identification information.

(13) The image processing device according to (1), in which the 3D model of the object represents color information of the object by a plurality of texture images that is captured from a plurality of directions, and represents geometry information of the object by a plurality of depth images respectively storing pieces of distance information in association with pixel values of the respective texture images.

(14) The image processing device according to (13), in which the 3D model generator represents the geometry information of the object by a polygon mesh having a voxel size that has been set, and thereafter converts the geometry information of the object into the depth images.

(15) The image processing device according to (1), in which the 3D model of the object represents geometry information of the object by a point cloud, and represents color information of the object in association with each point of the point cloud.

(16) The image processing device according to (1), in which the 3D model of the object represents geometry information of the object by a polygon mesh, and represents color information of the object in association with each polygon mesh.

(17) The image processing device according to (13) to (16), in which the 3D model generator sets a smaller voxel size with a decrease in a distance from an imaging device to the object.

(18) The image processing device according to (13) to (16), in which the 3D model generator sets a smaller voxel size to an object whose degree of attention of a user is higher.

(19) The image processing device according to (1), in which the 3D model of the object includes color information and geometry information of the object, the color information of the object is represented by a plurality of texture images that is captured from a plurality of directions, the image processing device further includes a selector that specifies a predetermined object on a basis of viewing information of a user, and selects, out of the plurality of texture images, the texture image that includes an object that has been specified, and the 3D model generator generates the 3D model of the object by using, as the color information of the object, the texture image that has been selected.

(20) An image processing method performed by an image processing device, the method including acquiring object spatial information indicating a 3D region of an object for each object, and generating a 3D model of an object for each object space.

REFERENCE SIGNS LIST

10 image processing system
21-1 to 21-N imaging device
22 storage device
23 3D reconstruction device
27 reproduction device
28 display device
30 selection device
61 foreground/background separator
62 object tracking section
63 3D model generator
81 parameter determination section
82 3D data generator
82 mesh converter
141 virtual camera
900 computer
901 CPU
902 ROM
903 RAM
906 input section
907 output section
908 storage
909 communication section
910 drive

The invention claimed is:

1. An image processing device comprising
a 3D model generator that acquires object spatial information indicating a 3D region of an object for each of a plurality of objects, and generates a 3D model of the object for each of a plurality of object spaces,
wherein the 3D model generator selects, based on whether a distance from an imaging device to the object is within a predetermined threshold, between representing geometry information of the object by a polygon mesh and representing the geometry information of the object by a point cloud.

2. The image processing device according to claim 1, wherein the 3D model generator determines a parameter of the 3D model of the object on a basis of position information of an imaging device that has imaged the object and the object.

3. The image processing device according to claim 2, wherein the 3D model generator determines the parameter on a basis of the position information of the imaging device and the object, the imaging device being nearest to the object of which the 3D model is to be generated out of a plurality of imaging devices that has imaged the object.

4. The image processing device according to claim 2, wherein the 3D model generator sets a smaller voxel size with a decrease in a distance from the imaging device to the object.

5. The image processing device according to claim 1, wherein the 3D model of the object represents color information of the object by a plurality of texture images that is captured from a plurality of directions, and represents the geometry information of the object by the point cloud or the polygon mesh.

6. The image processing device according to claim 5, wherein the 3D model generator represents the geometry information of the object by the polygon mesh in a case where the distance from the imaging device to the object is within the predetermined threshold, and represents the geometry information of the object by the point cloud in a case where the distance is larger than the predetermined threshold.

7. The image processing device according to claim 1, wherein the 3D model generator determines a parameter of the 3D model of the object on a basis of viewing information of a user and position information of the object.

8. The image processing device according to claim 7, wherein
the viewing information of the user is viewing range information indicating a viewing range of a user based on a perspective of a virtual camera, and
the 3D model generator generates the 3D model of the object that is included in the viewing range of the user.

9. The image processing device according to claim 8, wherein
the 3D model of the object represents color information of the object by a plurality of texture images that is captured from a plurality of directions, and represents geometry information of the object by a point cloud or a polygon mesh, and
the 3D model generator represents, with regard to an object whose degree of attention of the user is low, the geometry information of the object by the point cloud.

10. The image processing device according to claim 9, wherein the 3D model generator uses, as the degree of attention of the user, a distance from the virtual camera to the object.

11. The image processing device according to claim 8, wherein the 3D model generator sets a smaller voxel size to an object whose degree of attention of the user is higher.

12. The image processing device according to claim 7, wherein
the viewing information of the user is object identification information indicating the object designated as a display target by the user, and
the 3D model generator generates the 3D model of the object indicated by the object identification information.

13. The image processing device according to claim 1, wherein the 3D model of the object represents color information of the object by a plurality of texture images that is captured from a plurality of directions, and represents geometry information of the object by a plurality of depth images respectively storing pieces of distance information in association with pixel values of the respective texture images.

14. The image processing device according to claim 13, wherein the 3D model generator represents the geometry information of the object by a polygon mesh having a voxel size that has been set, and thereafter converts the geometry information of the object into the depth images.

15. The image processing device according to claim 13, wherein the 3D model generator sets a smaller voxel size with a decrease in a distance from an imaging device to the object.

16. The image processing device according to claim 13, wherein the 3D model generator sets a smaller voxel size to an object whose degree of attention of a user is higher.

17. The image processing device according to claim 1, wherein the 3D model of the object represents geometry information of the object by a point cloud, and represents color information of the object in association with each point of the point cloud.

18. The image processing device according to claim 1, wherein the 3D model of the object represents geometry information of the object by a polygon mesh, and represents color information of the object in association with each polygon mesh.

19. The image processing device according to claim 1, wherein
the 3D model of the object includes color information and geometry information of the object,
the color information of the object is represented by a plurality of texture images that is captured from a plurality of directions,
the image processing device further comprises a selector that specifies a predetermined object on a basis of viewing information of a user, and selects, out of the plurality of texture images, the texture image that includes an object that has been specified, and
the 3D model generator generates the 3D model of the object by using, as the color information of the object, the texture image that has been selected.

20. An image processing method performed by an image processing device, the method comprising:
acquiring object spatial information indicating a 3D region of an object for each of a plurality of objects, and generating a 3D model of the object for each of a plurality of object spaces; and
selecting, based on whether a distance from an imaging device to the object is within a predetermined threshold, between representing geometry information of the object by a polygon mesh and representing the geometry information of the object by a point cloud.

21. A non-transitory computer-readable medium having embodied thereon a program, which when executed by a computer causes the computer to execute an imaging processing method, the method comprising:
acquiring object spatial information indicating a 3D region of an object for each of a plurality of objects, and generating a 3D model of the object for each of a plurality of object spaces; and
selecting, based on whether a distance from an imaging device to the object is within a predetermined threshold, between representing geometry information of the object by a polygon mesh and representing geometry information of the object by a point cloud.

* * * * *